US012794733B2

(12) United States Patent
Hou

(10) Patent No.: US 12,794,733 B2
(45) Date of Patent: Nov. 10, 2026

(54) PACKET FORWARDING METHOD AND APPARATUS, AND NETWORK SYSTEM

(71) Applicant: HUAWEI TECHNOLOGIES CO., LTD., Shenzhen (CN)

(72) Inventor: Jianqiang Hou, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 524 days.

(21) Appl. No.: 18/341,630

(22) Filed: Jun. 26, 2023

(65) Prior Publication Data

US 2023/0336377 A1 Oct. 19, 2023

Related U.S. Application Data

(63) Continuation of application No. PCT/CN2021/133170, filed on Nov. 25, 2021.

(30) Foreign Application Priority Data

Dec. 29, 2020 (CN) ........................ 202011598688.X

(51) Int. Cl.
*H04L 12/46* (2006.01)
*H04L 45/64* (2022.01)

(52) U.S. Cl.
CPC .......... *H04L 12/4633* (2013.01); *H04L 45/64* (2013.01)

(58) Field of Classification Search
CPC ............. H04L 12/4604; H04L 12/4633; H04L 12/4641; H04L 2012/4629; H04L 45/00; H04L 45/02; H04L 45/50; H04L 45/64; H04L 45/74; H04L 67/146
See application file for complete search history.

(56) References Cited

U.S. PATENT DOCUMENTS

| | | | | |
|---|---|---|---|---|
| 10,764,249 | B1 | 9/2020 | Kommula et al. | |
| 2013/0230049 | A1* | 9/2013 | Zeng | H04L 45/22 370/392 |
| 2016/0359738 | A1* | 12/2016 | Sullenberger | H04L 69/22 |
| 2017/0214547 | A1 | 7/2017 | Mehta et al. | |
| 2019/0103990 | A1* | 4/2019 | Cidon | H04L 12/14 |
| 2020/0073692 | A1 | 3/2020 | Rao et al. | |

FOREIGN PATENT DOCUMENTS

| | | | |
|---|---|---|---|
| JP | 2004193878 | A | 7/2004 |
| JP | 2005260594 | A | 9/2005 |
| JP | 2017506025 | A | 2/2017 |

* cited by examiner

*Primary Examiner* — Mansour Oveissi

(57) ABSTRACT

Embodiments of this application disclose a packet forwarding method and apparatus, and a network system, and belong to the field of communication technologies. The method includes: When sending a first packet, first CPE may perform inner encapsulation and outer encapsulation on the first packet. The inner tunnel is an end-to-end tunnel between the first CPE and second CPE, and a second destination address in the outer tunnel encapsulation may be an address of a GW. It can be learned that in this application, an end-to-end inner tunnel may be established between the first CPE and the second CPE, and the inner tunnel may pass through a backbone network via the GW and then reach the second CPE on a basis that an outer tunnel is established so that the first CPE and the GW communicate with each other.

20 Claims, 17 Drawing Sheets

301 Receive a first packet, and obtain an initial destination address of the first packet

↓

302 Determine, by using a first overlay VRF in first CPE, a first source address and a first destination address of an inner tunnel corresponding to the initial destination address, and perform inner tunnel encapsulation on the first packet based on the first source address and the first destination address

↓

303 Determine, by using a first underlay VRF that is in the first CPE and that corresponds to the first source address, a second source address and a second destination address of an outer tunnel corresponding to the first destination address, perform, based on the second source address and the second destination address, outer tunnel encapsulation on the first packet on which the inner tunnel encapsulation is performed, and forward the first packet on which the outer tunnel encapsulation is performed

FIG. 8

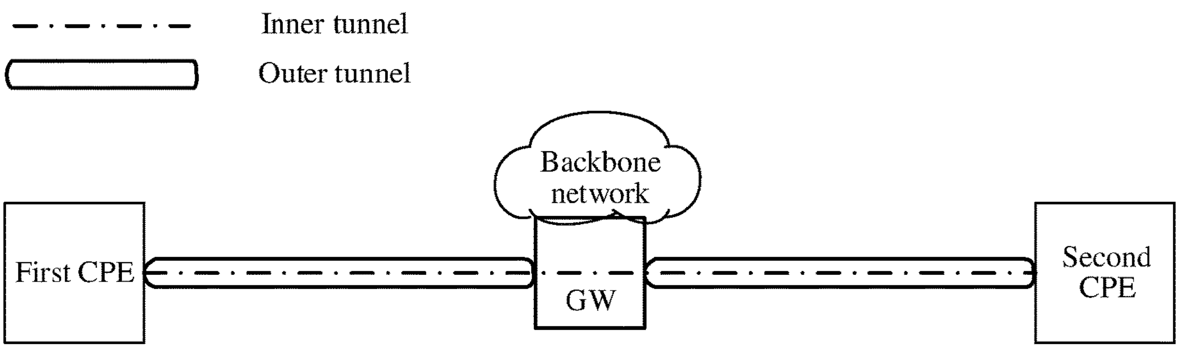

FIG. 9

PACKET FORWARDING METHOD AND APPARATUS, AND NETWORK SYSTEM

CROSS-REFERENCE TO RELATED APPLICATIONS

This application is a continuation of International Application No. PCT/CN2021/133170, filed on Nov. 25, 2021, which claims priority to Chinese Patent Application No. 202011598688.X, filed on Dec. 29, 2020. The disclosures of the aforementioned applications are hereby incorporated by reference in their entireties.

TECHNICAL FIELD

This application relates to the field of communication technologies, and in particular, to a packet forwarding method and apparatus, and a network system.

BACKGROUND

As enterprise services are constantly transferred to the cloud, software-defined networking in a wide area network (SD-WAN) emerges.

In the SD-WAN networking, usually, an operator deploys an SD-WAN gateway (GW) at an edge of a backbone network, and an overlay tunnel is established between an edge device (Edge) of an enterprise branch and the SD-WAN gateway, to implement communication between a local area network (LAN) side of the enterprise branch or headquarters and the backbone network. For example, customer premise equipments (CPE) at headquarters and a branch of an enterprise each establish an overlay tunnel to an SD-WAN GW. In this way, a segmented data transmission path including an overlay tunnel, a backbone network, and an overlay tunnel is formed between the headquarters and the branch.

In the SD-WAN networking, the branch and the headquarters of the enterprise are connected segment by segment. However, service-level agreement (SLA) quality detection is implemented based on an overlay tunnel. In this way, SLA quality detection cannot be implemented on a segmented data transmission path including an overlay tunnel, a backbone network, and an overlay tunnel.

SUMMARY

Embodiments of this application provide a packet forwarding method and apparatus, and a network system, to resolve a problem that SLA quality detection cannot be implemented on a segmented data transmission path including an overlay tunnel, a backbone network, and an overlay tunnel. The technical solutions are as follows.

According to a first aspect, a packet forwarding method is provided. The method is applied to a network system, the network system includes first CPE and second CPE, the method is executed by the first CPE in the network system, and the method includes:

receiving a first packet, and obtaining an initial destination address of the first packet; then, encapsulating the first packet, which may include inner tunnel encapsulation and outer tunnel encapsulation, where processing of the inner tunnel encapsulation may be determining a first source address and a first destination address of an inner tunnel corresponding to the initial destination address, and performing inner tunnel encapsulation on the first packet based on the first source address and the first destination address, where the inner tunnel is an end-to-end tunnel between the first CPE and the second CPE; and processing of the outer tunnel encapsulation may be determining a second source address and a second destination address of an outer tunnel corresponding to the first destination address, and performing, based on the second source address and the second destination address, outer tunnel encapsulation on the first packet on which the inner tunnel encapsulation is performed; and finally, forwarding the first packet on which the outer tunnel encapsulation is performed.

The inner tunnel is an end-to-end tunnel, and SLA quality detection may be performed, so that automatic switching may be implemented between the inner tunnel and another end-to-end tunnel based on SLA quality.

In an implementation, before the first CPE implements packet forwarding, the first CPE may be configured first. A configuration processing may be as follows:

receiving the second destination address sent by an RR, and establishing the outer tunnel based on the second source address and the second destination address, where a routing domain of a port corresponding to the second destination address is the same as a routing domain of a port corresponding to the second source address; receiving the first destination address sent by the RR, and establishing the inner tunnel based on the first source address and the first destination address on a basis that the establishment of the outer tunnel is completed, where a routing domain of a port corresponding to the first destination address is the same as a routing domain of a port corresponding to the first source address; and generating routing information of the inner tunnel in the first CPE, where the routing information includes a correspondence between the first destination address and the second source address and second destination address.

In an implementation, the configuration of the first CPE may further include the following processing:

receiving an overlay virtual routing and forwarding (VRF) configuration message sent by a controller, and establishing a first overlay VRF and a second overlay VRF in the first CPE; receiving an underlay VRF configuration message sent by the controller, and establishing a first underlay VRF in the first CPE; and receiving a port association message sent by the controller, associating the second overlay VRF with the port corresponding to the first source address, and associating the first underlay VRF with the port corresponding to second source address.

With reference to the foregoing implementation, after the first packet is received, the first overlay VRF in the first CPE may determine the first source address and the first destination address of the inner tunnel corresponding to the initial destination address, and perform inner tunnel encapsulation on the first packet based on the first source address and the first destination address. Then, the first overlay VRF sends the first packet on which the inner tunnel encapsulation is performed to the second overlay VRF that is in the first CPE and that corresponds to the first source address. Then, the second overlay VRF determines the second source address and the second destination address of the outer tunnel corresponding to the first destination address, and performs, based on the second source address and the second destination address, outer tunnel encapsulation on the first packet on which the inner tunnel encapsulation is performed. Then, the second overlay VRF sends the first packet on which the outer tunnel encapsulation is performed to the first underlay VRF corresponding to the second source address. Finally, the first underlay VRF forwards the first packet on which the outer tunnel encapsulation is performed.

In another implementation, the configuration of the first CPE may further include the following processing:

receiving an overlay VRF configuration message sent by a controller, and establishing a first overlay VRF and a second overlay VRF in the first CPE; receiving an underlay VRF configuration message sent by the controller, and establishing a first underlay VRF and a second underlay VRF in the first CPE; and receiving a port association message sent by the controller, associating the second underlay VRF with the port corresponding to the first source address, and associating the first underlay VRF with the port corresponding to second source address.

With reference to the foregoing implementation, after the first packet is received, the first overlay VRF may determine the first source address and the first destination address of the inner tunnel corresponding to the initial destination address, and perform inner tunnel encapsulation on the first packet based on the first source address and the first destination address. Then, the first overlay VRF sends the first packet on which the inner tunnel encapsulation is performed to the second underlay VRF corresponding to the first source address. Then, the second underlay VRF sends the first packet on which the inner tunnel encapsulation is performed to the second overlay VRF that is in the first CPE and that is connected to the second underlay VRF. Next, the second overlay VRF determines the second source address and the second destination address of the outer tunnel corresponding to the first destination address, performs, based on the second source address and the second destination address, outer tunnel encapsulation on the first packet on which the inner tunnel encapsulation is performed, and the second overlay VRF sends the first packet on which the outer tunnel encapsulation is performed to the first underlay VRF corresponding to the second source address. Finally, the first underlay VRF forwards the first packet on which the outer tunnel encapsulation is performed.

In an implementation, a connection manner between the second underlay VRF and the second overlay VRF may be an outer loop connection.

In an implementation, the outer loop connection may be connecting, by using a physical line outside the first CPE, physical ports associated with the second overlay VRF and the second underlay VRF.

In an implementation, a connection manner between the second underlay VRF and the second overlay VRF may be an inner loop connection.

In an implementation, the inner loop connection may be establishing a communication connection between loopback ports associated with the second underlay VRF and the second overlay VRF.

With reference to the foregoing implementation, the connection between the loopback ports may be established through the following processing:

receiving a connection establishment message sent by the controller, where the connection establishment message carries an identifier of the second underlay VRF and an identifier of the second overlay VRF; and establishing the connection between the loopback port corresponding to the second underlay VRF and the loopback port corresponding to the second overlay VRF.

In another implementation, the configuration of the first CPE may further include the following processing:

receiving an overlay VRF configuration message sent by a controller, and establishing a first overlay VRF in the first CPE; receiving an underlay VRF configuration message sent by the controller, and establishing a first underlay VRF in the first CPE; and receiving a port association message sent by the controller, and associating the first underlay VRF with the port corresponding to the first source address and the second source address.

With reference to the foregoing implementation, after the first packet is received, the first overlay VRF may determine the first source address and the first destination address of the inner tunnel corresponding to the initial destination address, and perform inner tunnel encapsulation on the first packet based on the first source address and the first destination address. Then, the first overlay VRF sends the first packet on which the inner tunnel encapsulation is performed to the first underlay VRF corresponding to the first source address. Then, the first underlay VRF determines the second source address and the second destination address of the outer tunnel corresponding to the first destination address, and performs, based on the second source address and the second destination address, outer tunnel encapsulation on the first packet on which the inner tunnel encapsulation is performed. Finally, the first underlay VRF forwards the first packet on which the outer tunnel encapsulation is performed.

In an implementation, the inner tunnel is an end-to-end tunnel between the first CPE and the second CPE, and if there are a plurality of end-to-end tunnels between the first CPE and the second CPE, when the first CPE sends a packet to the second CPE, the first CPE may perform path selection based on SLA quality of these tunnels. A processing may be as follows:

determining an inner tunnel with highest tunnel quality of service in a plurality of inner tunnels corresponding to the initial destination address, and determining a first source address and a first destination address of the inner tunnel with the highest tunnel quality of service. In addition, in addition to the inner tunnel, there may be a tunnel of another type, for example, an Internet tunnel.

According to a second aspect, a packet forwarding method is provided. The method is applied to a network system, the network system includes first CPE, a GW, and second CPE, the method is executed by the GW, and the method includes:

receiving a first packet sent by the first CPE, where the first packet includes inner tunnel encapsulation and outer tunnel encapsulation, and the inner tunnel is an end-to-end tunnel between the first CPE and the second CPE; removing the outer tunnel encapsulation of the first packet; and forwarding, based on a first destination address in the inner tunnel encapsulation of the first packet, the first packet from which the outer tunnel encapsulation is removed, where the first destination address is associated with the second CPE.

In an implementation, when an outer tunnel is established between the GW and the second CPE, after removing the outer encapsulation from the first packet, the GW further needs to perform further outer encapsulation. A processing may be as follows:

determining a third source address and a third destination address of an outer tunnel corresponding to the first destination address in the inner tunnel encapsulation of the first packet, and performing, based on the third source address and the third destination address, further outer tunnel encapsulation on the first packet from which the outer tunnel encapsulation is removed; and forwarding the first packet on which the further outer tunnel encapsulation is performed.

In an implementation, when the GW establishes the outer tunnel to the second CPE, processing may be as follows:

receiving the third destination address associated with the second CPE and sent by an RR, and establishing the outer tunnel based on the third destination address and the third source address, where a routing domain of a port corresponding to the third source address is the same as a routing domain of a port corresponding to the third destination address; and establishing a correspondence between the first destination address and the third source address and the third destination address of the outer tunnel.

According to a third aspect, a packet forwarding method is provided. The method is applied to a network system, the network system includes first CPE, a GW, and second CPE, the method is executed by the second CPE, and the method includes:

receiving a first packet, where the first packet is from the first CPE, the first packet includes inner tunnel encapsulation and outer tunnel encapsulation, and the inner tunnel is an end-to-end tunnel between the first CPE and the second CPE; removing the outer tunnel encapsulation of the first packet; and removing the inner tunnel encapsulation from the first packet from which the outer tunnel encapsulation is removed, and forwarding the first packet from which the inner tunnel encapsulation is removed.

In an implementation, the second CPE may process the first packet by using VRFs configured in the second CPE. The processing may be as follows:

A first underlay VRF in the second CPE receives the first packet, removes the outer tunnel encapsulation of the first packet, and then sends, to a first overlay VRF in the second CPE, the first packet from which the outer tunnel encapsulation is removed. Then, the first overlay VRF removes the inner tunnel encapsulation from the first packet from which the outer tunnel encapsulation is removed, and forwards the first packet from which the inner tunnel encapsulation is removed.

In another implementation, the processing performed on the first packet by using VRFs may include the following processing:

A first underlay VRF in the second CPE receives the first packet, and sends the first packet to a second overlay VRF in the second CPE. Then, the second overlay VRF removes the outer tunnel encapsulation of the first packet, and the second overlay VRF sends, to a first overlay VRF in the second CPE, the first packet from which the outer tunnel encapsulation is removed. Finally, the first overlay VRF removes the inner tunnel encapsulation from the first packet from which the outer tunnel encapsulation is removed, and forwards the first packet from which the inner tunnel encapsulation is removed.

With reference to the foregoing implementation, that the second overlay VRF sends, to a first overlay VRF, the first packet from which the outer tunnel encapsulation is removed may further include the following processing:

The second overlay VRF removes the outer tunnel encapsulation of the first packet, and sends, to a second underlay VRF connected to the second overlay VRF, the first packet from which the outer tunnel encapsulation is removed. Finally, the second underlay VRF sends, to the first overlay VRF, the first packet from which the outer tunnel encapsulation is removed.

In an implementation, the second underlay VRF is connected to the second overlay VRF by using an outer loop.

In an implementation, the second underlay VRF is connected to the second overlay VRF through a corresponding physical port.

In an implementation, the second underlay VRF is connected to the second overlay VRF by using an inner loop.

In an implementation, the second underlay VRF is connected to the second overlay VRF through a corresponding loopback port.

According to a fourth aspect, a CPE configuration method is provided. The method is applied to a network system, the network system includes first customer premises equipment CPE, a gateway GW, second CPE, and a route reflector RR, the method is executed by the first CPE, and the method includes:

receiving a second destination address associated with the GW and sent by the RR, and establishing an outer tunnel based on a second source address and the second destination address; receiving a first destination address associated with the second CPE and sent by the RR, and establishing an inner tunnel based on a first source address and the first destination address, where the inner tunnel is an end-to-end tunnel between the first CPE and the second CPE; and generating routing information of the inner tunnel in the first CPE, where the routing information includes a correspondence between the first destination address and the second source address and second destination address.

In an implementation, after the foregoing configuration, the first CPE may forward a first packet. A processing may be as follows:

receiving the first packet, and obtaining an initial destination address of the first packet; determining the first source address and the first destination address of the inner tunnel corresponding to the initial destination address, and performing inner tunnel encapsulation on the first packet based on the first source address and the first destination address, where the inner tunnel is an end-to-end tunnel between the first CPE and the second CPE; determining the second source address and the second destination address of the outer tunnel corresponding to the first destination address, and performing, based on the second source address and the second destination address, outer tunnel encapsulation on the first packet on which the inner tunnel encapsulation is performed; and forwarding the first packet on which the outer tunnel encapsulation is performed.

In an implementation, VRFs may be further configured in the first CPE to process the first packet. A configuration may be as follows:

receiving an overlay VRF configuration message sent by a controller, and establishing a first overlay VRF and a second overlay VRF in the first CPE; receiving an underlay VRF configuration message sent by the controller, and establishing a first underlay VRF in the first CPE; and receiving a port association message sent by the controller, associating the second overlay VRF with a port corresponding to the first source address, and associating the first underlay VRF with the port corresponding to second source address.

In an implementation, after the foregoing configuration, the first CPE may forward the first packet. A processing may be as follows:

After the first packet is received and the initial destination address of the first packet is obtained, the first overlay VRF determines the first source address and the first destination address of the inner tunnel corresponding to the initial destination address, performs inner tunnel encapsulation on the first packet based on the first source address and the first destination address, where the inner tunnel is an end-to-end tunnel between the first CPE and the second CPE; and sends the first packet on which the inner tunnel encapsulation is performed to the second overlay VRF corresponding to the first source address. Then, the second overlay VRF determines the second source address and the second destination address of the outer tunnel corresponding to the first destination address, performs, based on the second source address and the second destination address, outer tunnel encapsulation on the first packet on which the inner tunnel encapsulation is performed, and sends the first packet on which the outer tunnel encapsulation is performed to the first underlay VRF corresponding to the second source address. Finally, the first underlay VRF forwards the first packet on which the outer tunnel encapsulation is performed.

In another implementation, VRFs in the first CPE may alternatively be processed in the following manner:

receiving an overlay VRF configuration message sent by a controller, and establishing a first overlay VRF and a second overlay VRF in the first CPE; receiving an underlay VRF configuration message sent by the controller, and establishing a first underlay VRF and a second underlay VRF in the first CPE; and receiving a port association message sent by the controller, associating the second underlay VRF with a port corresponding to the first source address, and associating the first underlay VRF with a port corresponding to the second source address.

In an implementation, after the foregoing configuration, the first CPE may forward the first packet. A processing may be as follows:

After the first packet is received and the initial destination address of the first packet is obtained, the first overlay VRF determines the first source address and the first destination address of the inner tunnel corresponding to the initial destination address, performs inner tunnel encapsulation on the first packet based on the first source address and the first destination address, where the inner tunnel is an end-to-end tunnel between the first CPE and the second CPE; and sends the first packet on which the inner tunnel encapsulation is performed to the second underlay VRF corresponding to the first source address. Then, the second underlay VRF sends the first packet on which the inner tunnel encapsulation is performed to the second overlay VRF that is in the first CPE and that is connected to the second underlay VRF. Then, the second overlay VRF determines the second source address and the second destination address of the outer tunnel corresponding to the first destination address, performs, based on the second source address and the second destination address, outer tunnel encapsulation on the first packet on which the inner tunnel encapsulation is performed, and sends the first packet on which the outer tunnel encapsulation is performed to the first underlay VRF corresponding to the second source address. Finally, the first underlay VRF forwards the first packet on which the outer tunnel encapsulation is performed.

In another implementation, VRFs in the first CPE may alternatively be processed in the following manner:

receiving an overlay VRF configuration message sent by a controller, and establishing a first overlay VRF in the first CPE; receiving an underlay VRF configuration message sent by the controller, and establishing a first underlay VRF in the first CPE; and receiving a port association message sent by the controller, and associating the first overlay VRF with a port corresponding to the first source address and a port corresponding to the second source address.

In an implementation, after the foregoing configuration, the first CPE may forward the first packet. A processing may be as follows:

After the first packet is received and the initial destination address of the first packet is obtained, the first overlay VRF determines the first source address and the first destination address of the inner tunnel corresponding to the initial destination address, performs inner tunnel encapsulation on the first packet based on the first source address and the first destination address, and sends the first packet on which the inner tunnel encapsulation is performed to the first underlay VRF corresponding to the first source address. Then, the first underlay VRF determines the second source address and the second destination address of the outer tunnel corresponding to the first destination address, performs, based on the second source address and the second destination address, outer tunnel encapsulation on the first packet on which the inner tunnel encapsulation is performed, and forwards the first packet on which the outer tunnel encapsulation is performed.

According to a fifth aspect, a CPE configuration method is provided. The method is applied to an RR, and the method includes:

receiving a second destination address associated with a GW and sent by the GW, and sending the second destination address to first CPE; and receiving a first destination address associated with second CPE and sent by second CPE, and sending the first destination address to the first CPE.

According to a sixth aspect, a CPE configuration method is provided. The method is applied to a controller, and the method includes: sending an overlay VRF configuration message to first CPE, sending an underlay VRF configuration message to the first CPE, and sending a port association message to the first CPE.

In an implementation, the overlay VRF configuration message carries a VRF identifier of a first overlay VRF and a VRF identifier of a second overlay VRF, the underlay VRF configuration message carries a VRF identifier of a first underlay VRF, and the port association message carries a correspondence between the VRF identifier of the second overlay VRF and a first source address, and a correspondence between the VRF identifier of the first underlay VRF and a second source address.

In an implementation, the overlay VRF configuration message carries a VRF identifier of a first overlay VRF and a VRF identifier of a second overlay VRF, the underlay VRF configuration message carries a VRF identifier of a first underlay VRF and a VRF identifier of a second underlay VRF, and the port association message carries a correspondence between the VRF identifier of the second underlay VRF and a first source address, and a correspondence between the VRF identifier of the first underlay VRF and a second source address.

In an implementation, the overlay VRF configuration message carries a VRF identifier of a first overlay VRF, the underlay VRF configuration message carries a VRF identifier of a first underlay VRF, and the port association message carries a correspondence between the VRF identifier of the first overlay VRF and a first source address and second source address.

According to a seventh aspect, a packet forwarding apparatus is provided, configured to perform any implementation of the first aspect or the fourth aspect. The apparatus includes a module configured to perform any implementation of the first aspect or the fourth aspect.

According to an eighth aspect, a packet forwarding apparatus is provided, configured to perform any implementation of the second aspect. The apparatus includes a module configured to perform any implementation of the second aspect.

According to a ninth aspect, a packet forwarding apparatus is provided, configured to perform any implementation of the third aspect. The apparatus includes a module configured to perform any implementation of the third aspect.

According to a tenth aspect, first CPE is provided. The first CPE includes a processor and a memory, the memory is configured to store instructions, and the processor is configured to execute the instructions to implement the method according to the first aspect or the fourth aspect.

According to an eleventh aspect, a GW is provided. The GW includes a processor and a memory, the memory is configured to store instructions, and the processor is configured to execute the instructions to implement the method according to the second aspect.

According to a twelfth aspect, second CPE is provided. The second CPE includes a processor and a memory, the memory is configured to store instructions, and the processor is configured to execute the instructions to implement the method according to the third aspect.

According to a thirteenth aspect, an RR is provided. The RR includes a processor and a memory, the memory is configured to store instructions, and the processor is configured to execute the instructions to implement the method according to the fifth aspect.

According to a fourteenth aspect, a controller is provided. The controller includes a processor and a memory, the memory is configured to store instructions, and the processor is configured to execute the instructions to implement the method according to the sixth aspect.

According to a fifteenth aspect, a network system is provided. The network system includes the first CPE according to the tenth aspect, the GW according to the eleventh aspect, and the second CPE according to the twelfth aspect.

Beneficial effects brought by the technical solutions provided in embodiments of this application are as follows:

In embodiments of this application, when sending the first packet, the first CPE may perform inner encapsulation and outer encapsulation on the first packet, the inner tunnel is an end-to-end tunnel between the first CPE and the second CPE, and the second destination address in the outer tunnel encapsulation may be an address of the GW. It can be learned that in this application, an end-to-end inner tunnel may be established between the first CPE and the second CPE, and the inner tunnel may pass through a backbone network via the GW and then reach the second CPE on a basis that the outer tunnel is established so that the first CPE and the GW communicate with each other. In this way, the inner tunnel is an end-to-end tunnel, and SLA quality detection may be performed, so that automatic switching may be implemented between the inner tunnel and another end-to-end tunnel based on SLA quality.

BRIEF DESCRIPTION OF DRAWINGS

FIG. 8 is a flowchart of a packet forwarding method according to an embodiment of this application;

FIG. 9 is a diagram of SD-WAN networking according to an embodiment of this application;

DESCRIPTION OF EMBODIMENTS

Figure 1:
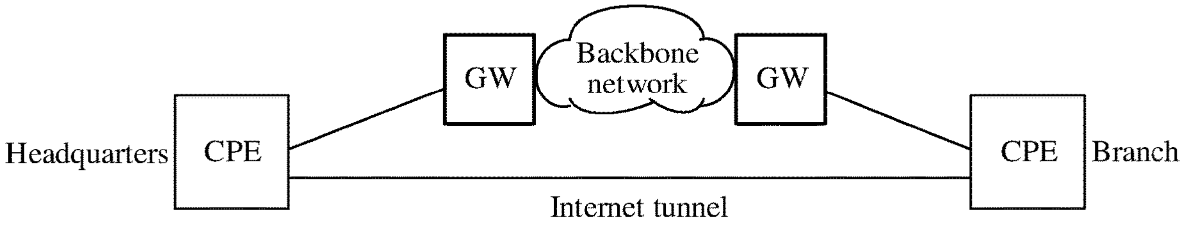
FIG. 1 is a diagram of SD-WAN networking according to an embodiment of this application.

Embodiments of this application provide a packet forwarding method. The method may be applied to SD-WAN networking. FIG. 1 shows an SD-WAN networking deployment manner. FIG. 1 includes headquarters and a branch of a same enterprise. The headquarters establishes a connection to a GW in SD-WAN networking by using CPE, to access a backbone network of an operator. The branch also establishes a connection to a GW by using CPE, to access the backbone network of the operator. A plurality of tunnels, for example, an Internet tunnel, may also be established between the headquarters and the branch by using respective CPEs. According to embodiments of this application, an end-to-end tunnel between two CPEs can be established by using a GW and a backbone network, and a packet can be transmitted through the tunnel.

In addition, in addition to the deployment manner shown in FIG. 1, the two CPEs may be connected to a same GW, or one CPE is connected to a GW and the other CPE directly accesses the backbone network without being connected to a GW, or one CPE is connected to a plurality of GWs. Certainly, the foregoing example is SD-WAN networking including a CPE of headquarters and a CPE of only one branch. In actual application, there may be CPEs of a plurality of branches, and each CPE may be separately connected to one GW, or the plurality of branches are connected to a same GW, or some CPEs are directly connected to a backbone network without being connected to a GW, or a same CPE is connected to a plurality of GWs.

The following describes processing procedures in which first CPE (on a packet sending side), a GW, and second CPE (on a packet receiving side) implement embodiments of this application.

Figure 2:
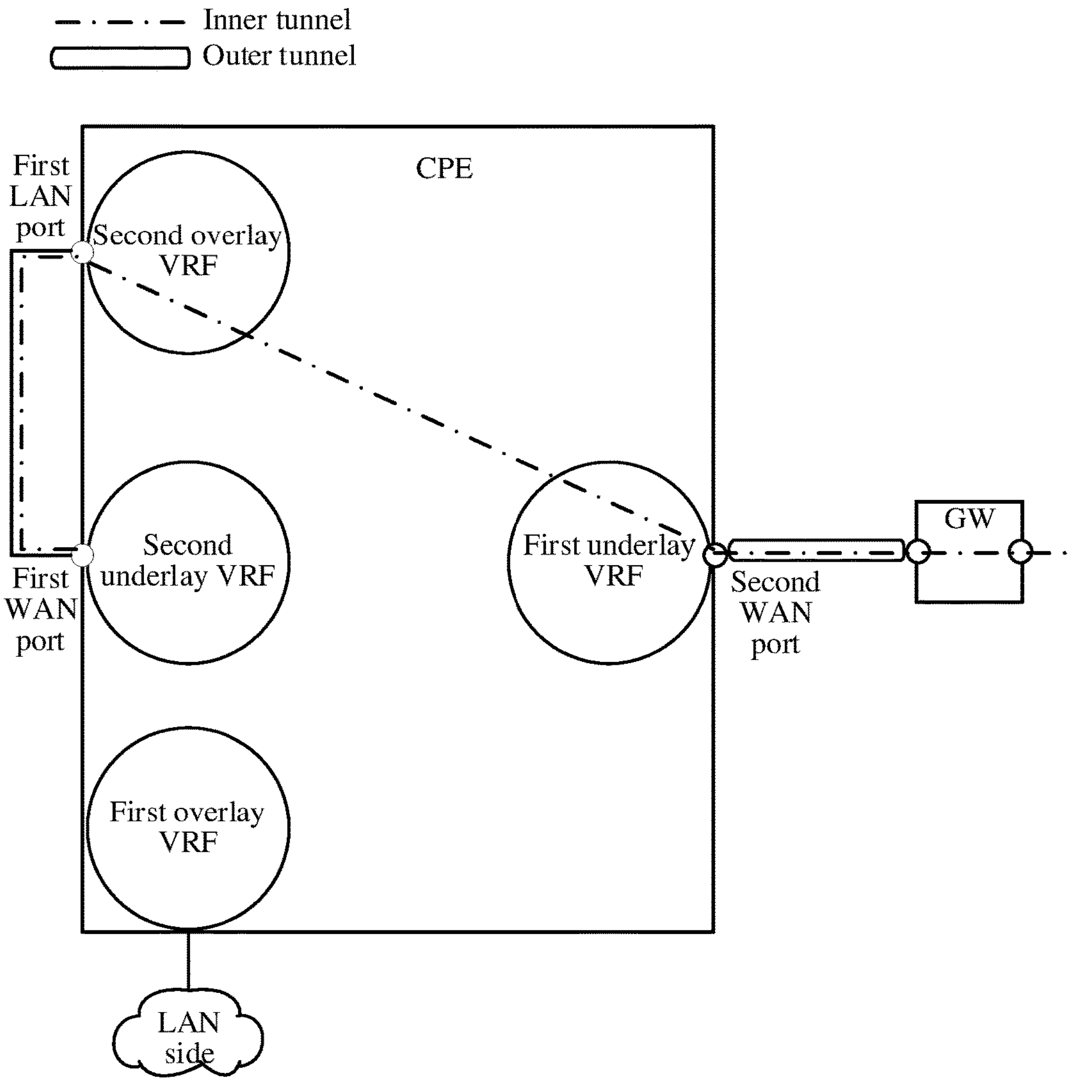
FIG. 2 is a diagram of CPE according to an embodiment of this application.
Figure 3:
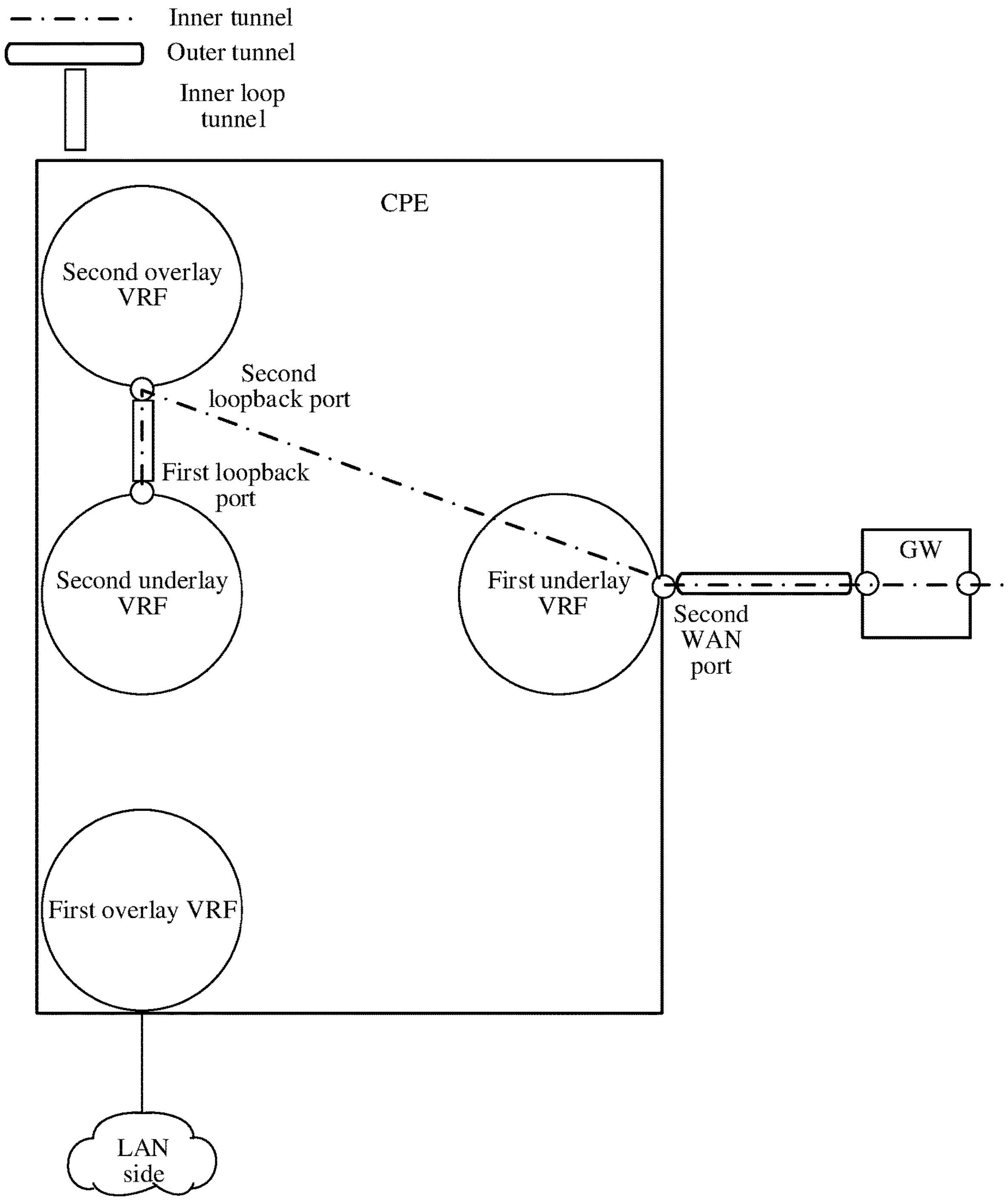
FIG. 3 is a diagram of CPE according to an embodiment of this application.
Figure 4:
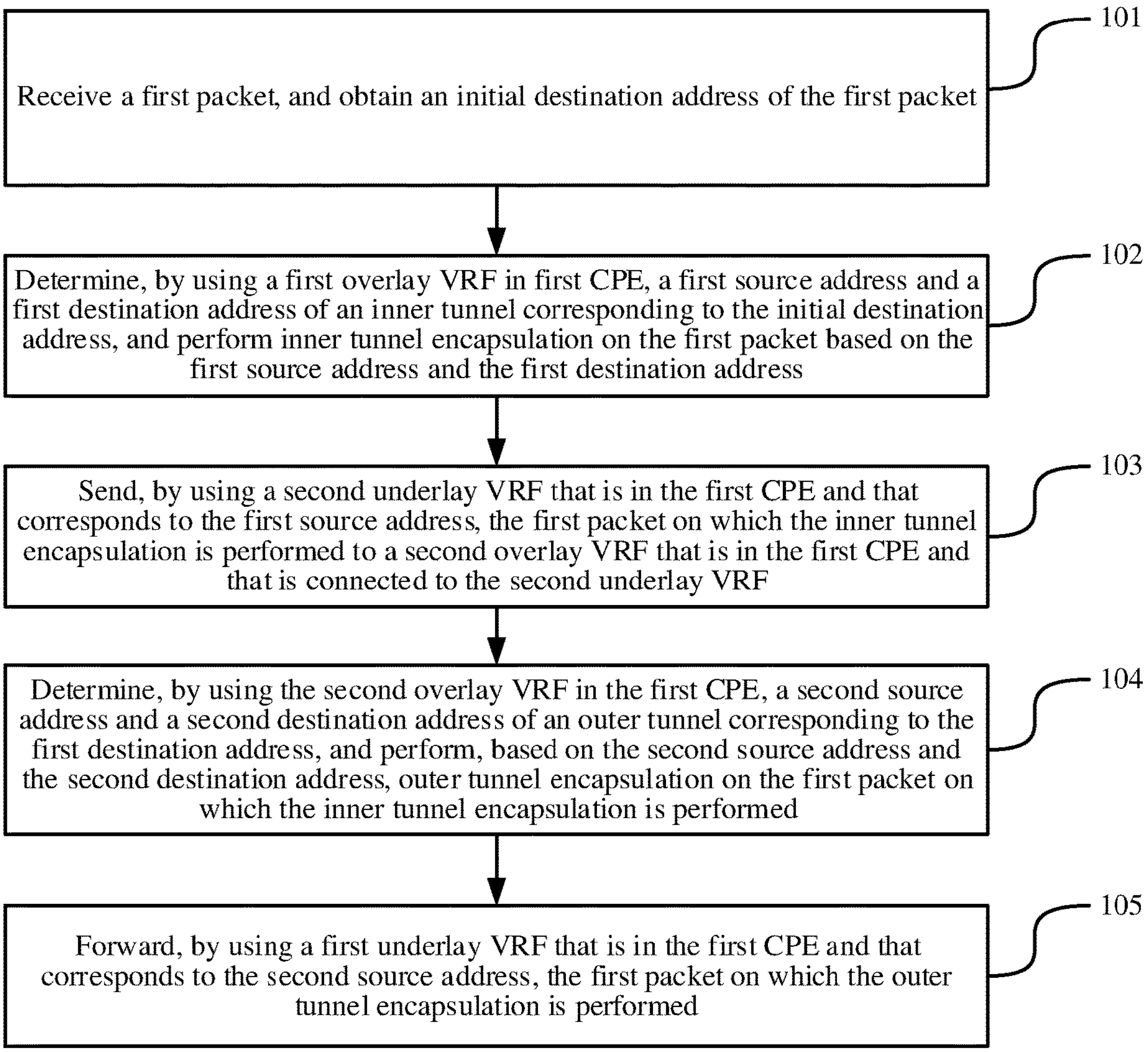
FIG. 4 is a flowchart of a packet forwarding method according to an embodiment of this application.

The following uses CPE in FIG. 2 and FIG. 3 as the first CPE on the sending side to describe a processing procedure of packet forwarding by the first CPE. Refer to FIG. 4. The processing procedure of packet forwarding by the first CPE may include the following steps.

S101. Receive a first packet, and obtain an initial destination address of the first packet.

In an implementation, a terminal device on a local area network (LAN) side corresponding to the first CPE may send a packet to a terminal device on a LAN side of another CPE. For example, a first terminal device on the LAN side corresponding to the first CPE may send a packet to a second terminal device on a LAN side corresponding to the second CPE.

The terminal device on the LAN side corresponding to the first CPE may generate a first packet, and send the first packet to a connected LAN port of the first CPE. The first packet carries an initial destination address, and the initial destination address is an IP address of a terminal device that is on a LAN side of another CPE and that is configured to receive the first packet.

A first overlay virtual routing and forwarding (VRF) in the first CPE and associated with the LAN port may receive and obtain the first packet, and obtain the initial destination address carried in the first packet.

S102. Determine, by using the first overlay VRF in the first CPE, a first source address and a first destination address of an inner tunnel corresponding to the initial destination address, and perform inner tunnel encapsulation on the first packet based on the first source address and the first destination address.

The first overlay VRF is a VRF associated with each LAN port on the LAN side of the first CPE.

In an implementation, the first overlay VRF may determine, based on a stored correspondence between a destination address set and CPE, that CPE corresponding to the initial destination address is the second CPE. Then, at least one end-to-end tunnel between the first CPE and the second CPE may be determined based on a stored correspondence between CPE and an end-to-end tunnel.

In addition, quality of service of each tunnel may be further recorded in the first CPE. The quality of service may be obtained by the first CPE through measurement based on a preset periodicity.

The first overlay VRF may select a tunnel with best quality of service from a plurality of end-to-end tunnels corresponding to the second CPE, as a tunnel used to transmit the first packet this time.

Then, the first overlay VRF may determine, from stored source addresses and destination addresses of tunnels, a first source address and a first destination address of the tunnel used to transmit the first packet this time. In this application, only the selected tunnel being an inner tunnel is described. As shown in FIG. 2, the first source address of the inner tunnel is an IP address of a first wide area network (WAN) port in the first CPE, and the first destination address is an IP address of a first WAN port in the second CPE. Alternatively, as shown in FIG. 3, the first source address is an IP address of a first loopback port in the first CPE, and the first destination address is an IP address of a first loopback port in the second CPE.

Then, the first overlay VRF determines a tunneling protocol of the selected tunnel, and performs inner tunnel encapsulation on the first packet based on the tunneling protocol. The first packet on which the inner tunnel encapsulation is performed carries the first source address and the first destination address of the tunnel. The tunneling protocol may be a generic routing encapsulation (GRE) protocol, an Internet protocol security (IPsec) protocol, or the like.

In addition, the first packet on which the inner tunnel encapsulation is performed may further carry a VRF identifier of the first overlay VRF that performs the inner tunnel encapsulation.

S103. Send, by using a second underlay VRF that is in the first CPE and that corresponds to the first source address, the first packet on which the inner tunnel encapsulation is performed to a second overlay VRF that is in the first CPE and that is connected to the second underlay VRF.

In an implementation, the first overlay VRF sends the first packet on which the inner tunnel encapsulation is performed to an underlay VRF associated with the port corresponding to the first source address, for example, a second underlay VRF shown in FIG. 2 and FIG. 3. Then, the second underlay VRF sends, through the port corresponding to the first source address, the first packet on which the inner tunnel encapsulation is performed to a connected overlay VRF, for example, a second overlay VRF shown in FIG. 2 and FIG. 3.

Herein, it should be noted that in the first CPE shown in FIG. 2 and the first CPE shown in FIG. 3, the second underlay VRF and the second overlay VRF are connected in different manners. In FIG. 2, the first WAN port associated with the second underlay VRF and a first LAN port associated with the second overlay VRF are connected by using a physical line. In FIG. 3, an inner loop tunnel is established between the first loopback port associated with the second underlay VRF and a second loopback port associated with the second overlay VRF to implement a connection. A tunneling protocol based on which the inner loop tunnel is established may be the GRE protocol or the like.

S104. Determine, by using the second overlay VRF in the first CPE, a second source address and a second destination address of an outer tunnel corresponding to the first destination address, and perform, based on the second source address and the second destination address, outer tunnel encapsulation on the first packet on which the inner tunnel encapsulation is performed.

In an implementation, after receiving the first packet on which the inner tunnel encapsulation is performed, the second overlay VRF obtains the first destination address carried in the first packet, and queries routing information to determine an egress port corresponding to the first destination address, for example, a second WAN port shown in FIG. 2. Then, a second source address and a second destination address of an outer tunnel corresponding to the second WAN port, and a tunneling protocol of the outer tunnel may be obtained, and based on the tunneling protocol, outer tunnel encapsulation is performed on the first packet on which the inner tunnel encapsulation is performed. The first packet on which the outer tunnel encapsulation is performed carries the second source address and the second destination address of the outer tunnel. The second source address is an IP address of the second WAN port in the first CPE, and the second destination address is an IP address of a corresponding WAN port in a GW at a tunnel destination end. The tunneling protocol of the outer tunnel may be a GRE over IPsec protocol.

In addition, the first packet on which the outer tunnel encapsulation is performed may further carry a VRF identifier of the second overlay VRF that performs the outer tunnel encapsulation.

S105. Forward, by using a first underlay VRF that is in the first CPE and that corresponds to the second source address, the first packet on which the outer tunnel encapsulation is performed.

In an implementation, the second overlay VRF sends the first packet on which the outer encapsulation is performed to an underlay VRF corresponding to the second source address, for example, a first underlay VRF shown in FIG. 2. Then, the first underlay VRF forwards the first packet on which the outer tunnel encapsulation is performed to the GW through the second WAN port.

Figure 5:
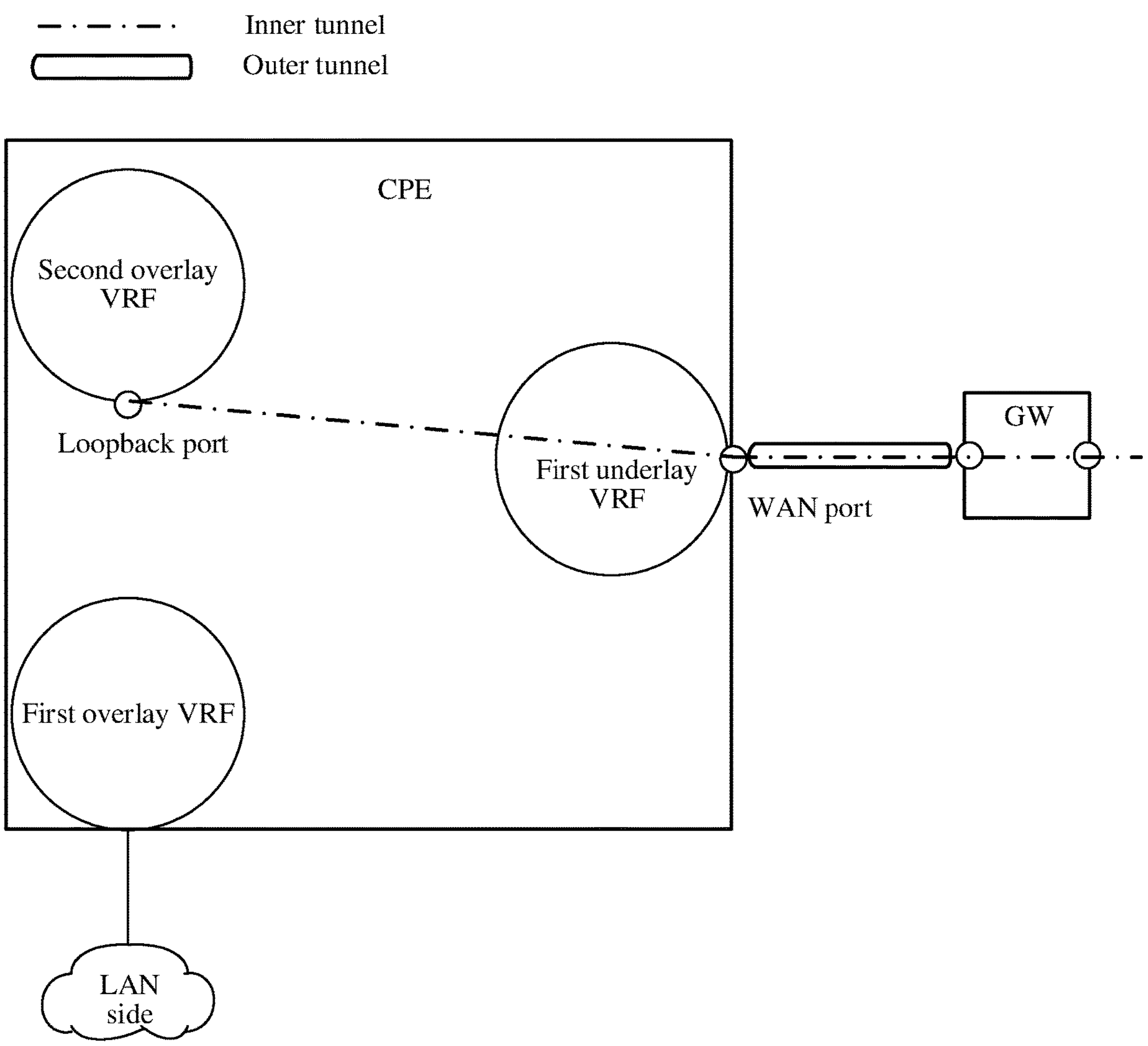
FIG. 5 is a diagram of CPE according to an embodiment of this application.
Figure 6:
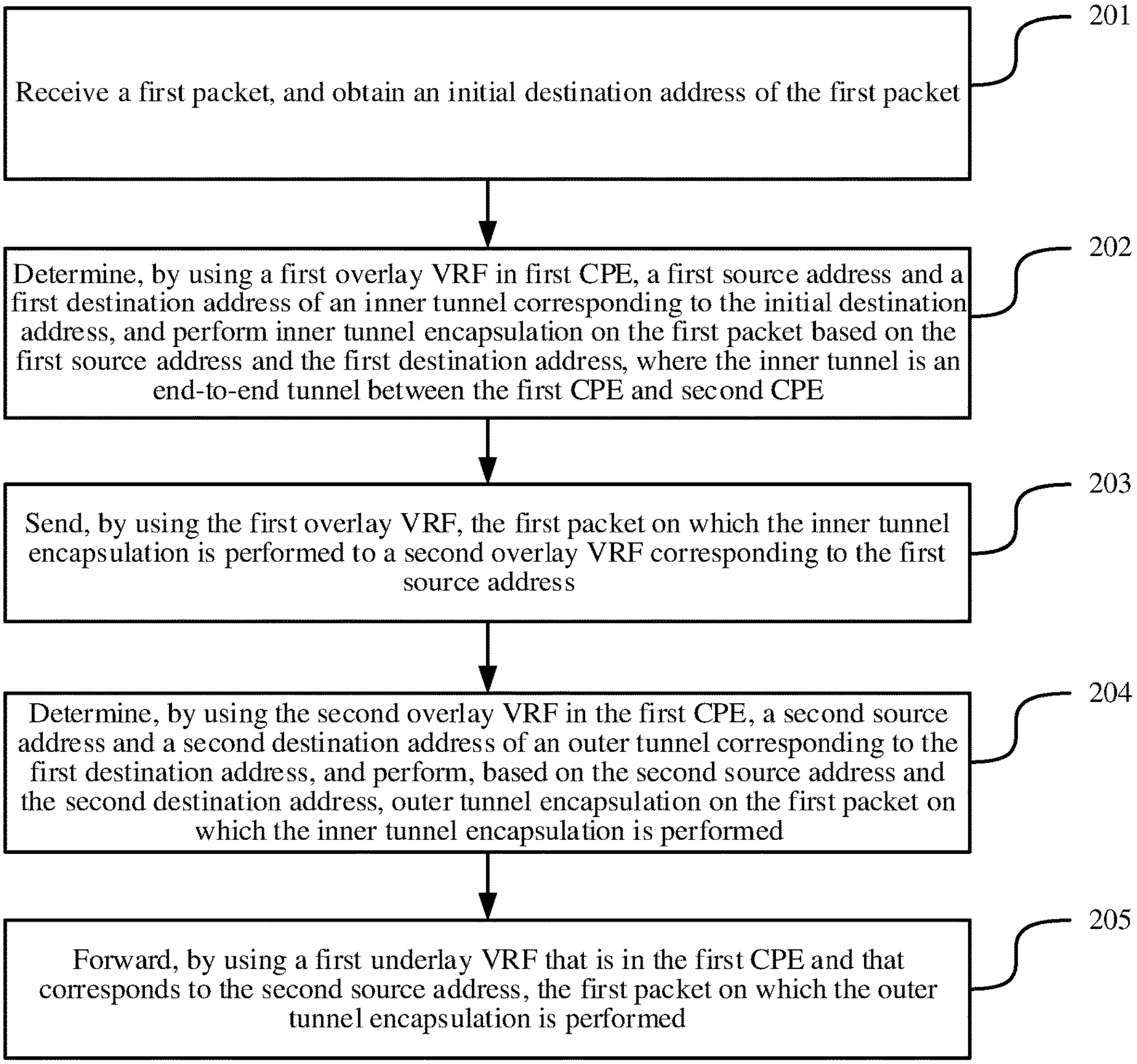
FIG. 6 is a flowchart of a packet forwarding method according to an embodiment of this application.

The following uses CPE in FIG. 5 as the first CPE on the sending side to describe a processing procedure of packet forwarding by the first CPE. Refer to FIG. 6. The processing procedure of packet forwarding by the first CPE may include the following steps.

S201. Receive a first packet, and obtain an initial destination address of the first packet.

S202. Determine, by using a first overlay VRF in the first CPE, a first source address and a first destination address of an inner tunnel corresponding to the initial destination address, and perform inner tunnel encapsulation on the first packet based on the first source address and the first destination address, where the inner tunnel is an end-to-end tunnel between the first CPE and the second CPE.

As shown in FIG. 5, the first source address is an IP address of a loopback port in the first CPE. When the second CPE is deployed in a same manner as the CPE shown in FIG. 5, the first destination address is an IP address of a loopback port in the second CPE.

S203. Send, by using the first overlay VRF, the first packet on which the inner tunnel encapsulation is performed to a second overlay VRF corresponding to the first source address.

In an implementation, as shown in FIG. 5, the first overlay VRF sends the first packet on which the inner tunnel encapsulation is performed to the loopback port corresponding to the first source address. A second overlay VRF associated with the loopback port obtains, through the loopback port, the first packet on which the inner tunnel encapsulation is performed.

S204. Determine, by using the second overlay VRF in the first CPE, a second source address and a second destination address of an outer tunnel corresponding to the first destination address, and perform, based on the second source address and the second destination address, outer tunnel encapsulation on the first packet on which the inner tunnel encapsulation is performed.

In an implementation, after receiving the first packet on which the inner tunnel encapsulation is performed, the second overlay VRF obtains the first destination address carried in the first packet, and queries routing information to determine an egress port corresponding to the first destination address, for example, a WAN port shown in FIG. 5. Then, a second source address and a second destination address of an outer tunnel corresponding to the WAN port, and a tunneling protocol of the outer tunnel may be obtained, and based on the tunneling protocol, outer tunnel encapsulation is performed on the first packet on which the inner tunnel encapsulation is performed. The first packet on which the outer tunnel encapsulation is performed carries the second source address and the second destination address of the outer tunnel. The second source address is an IP address of the WAN port in the first CPE, and the second destination address is an IP address of a corresponding WAN port in a GW at a tunnel destination end.

S205. Forward, by using a first underlay VRF that is in the first CPE and that corresponds to the second source address, the first packet on which the outer tunnel encapsulation is performed.

Herein, it should be noted that implementations of S201, S202, and S205 are respectively the same as or similar to implementations of S101, S102, and S105 shown in FIG. 4. Details are not described herein again.

Figure 7:
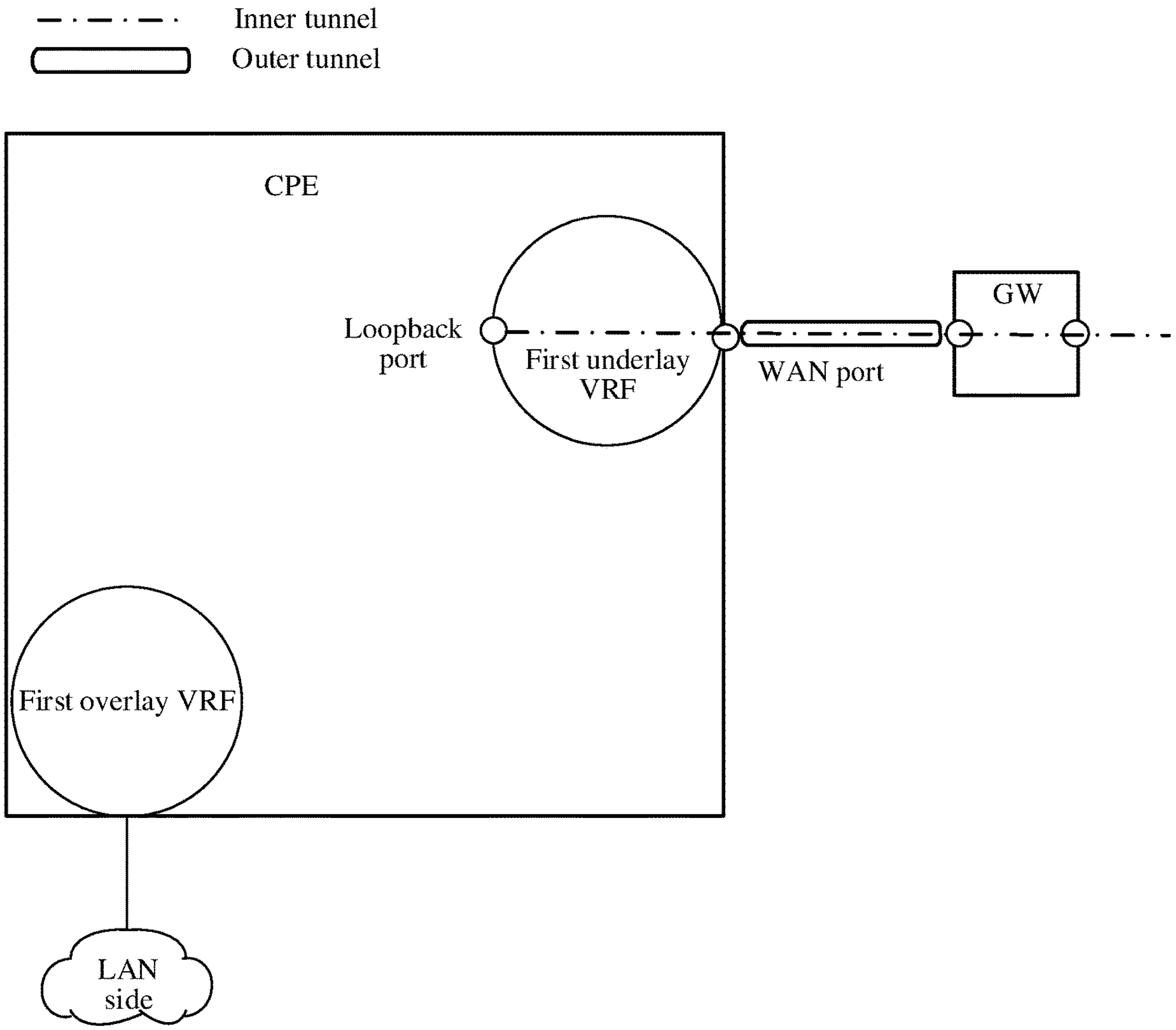
FIG. 7 is a diagram of CPE according to an embodiment of this application.

The following uses CPE in FIG. 7 as the first CPE on the sending side to describe a processing procedure of packet forwarding by the first CPE. Refer to FIG. 8. The processing procedure of packet forwarding by the first CPE may include the following steps.

S301. Receive a first packet, and obtain an initial destination address of the first packet.

S302. Determine, by using a first overlay VRF in the first CPE, a first source address and a first destination address of an inner tunnel corresponding to the initial destination address, and perform inner tunnel encapsulation on the first packet based on the first source address and the first destination address.

As shown in FIG. 7, the first source address is an IP address of a loopback port in the first CPE. When the second CPE is deployed in a same manner as the CPE shown in FIG. 7, the first destination address is an IP address of a loopback port in the second CPE.

S303. Determine, by using a first underlay VRF that is in the first CPE and that corresponds to the first source address, a second source address and a second destination address of an outer tunnel corresponding to the first destination address, perform, based on the second source address and the second destination address, outer tunnel encapsulation on the first packet on which the inner tunnel encapsulation is performed, and forward the first packet on which the outer tunnel encapsulation is performed.

As shown in FIG. 7, the second source address is an IP address of a WAN port of the first CPE, and correspondingly, the second destination address is an IP address of a WAN port of a GW in FIG. 7.

In an implementation, the first overlay VRF sends the first packet on which the inner tunnel encapsulation is performed to an underlay VRF associated with the port corresponding to the first source address, for example, a first underlay VRF shown in FIG. 7.

After receiving the first packet on which the inner tunnel encapsulation is performed, the first underlay VRF obtains the first destination address carried in the first packet, and queries routing information to determine an egress port corresponding to the first destination address, for example, a WAN port shown in FIG. 7.

Then, the first underlay VRF may obtain a second source address and a second destination address of an outer tunnel corresponding to the WAN port, and a tunneling protocol of the outer tunnel, and perform, based on the tunneling protocol, outer tunnel encapsulation on the first packet on which the inner tunnel encapsulation is performed. The first packet on which the outer tunnel encapsulation is performed carries the second source address and the second destination address of the outer tunnel. The second source address is the IP address of the WAN port in the first CPE, and the second destination address is an IP address of a corresponding WAN port in a GW at a tunnel destination end.

Finally, the first underlay VRF forwards the first packet on which the outer tunnel encapsulation is performed to the GW through the WAN port.

Herein, it should be noted that implementations of S301 and S302 are respectively the same as or similar to implementations of S101 and S102 shown in FIG. 4. Details are not described herein again.

Figure 10:
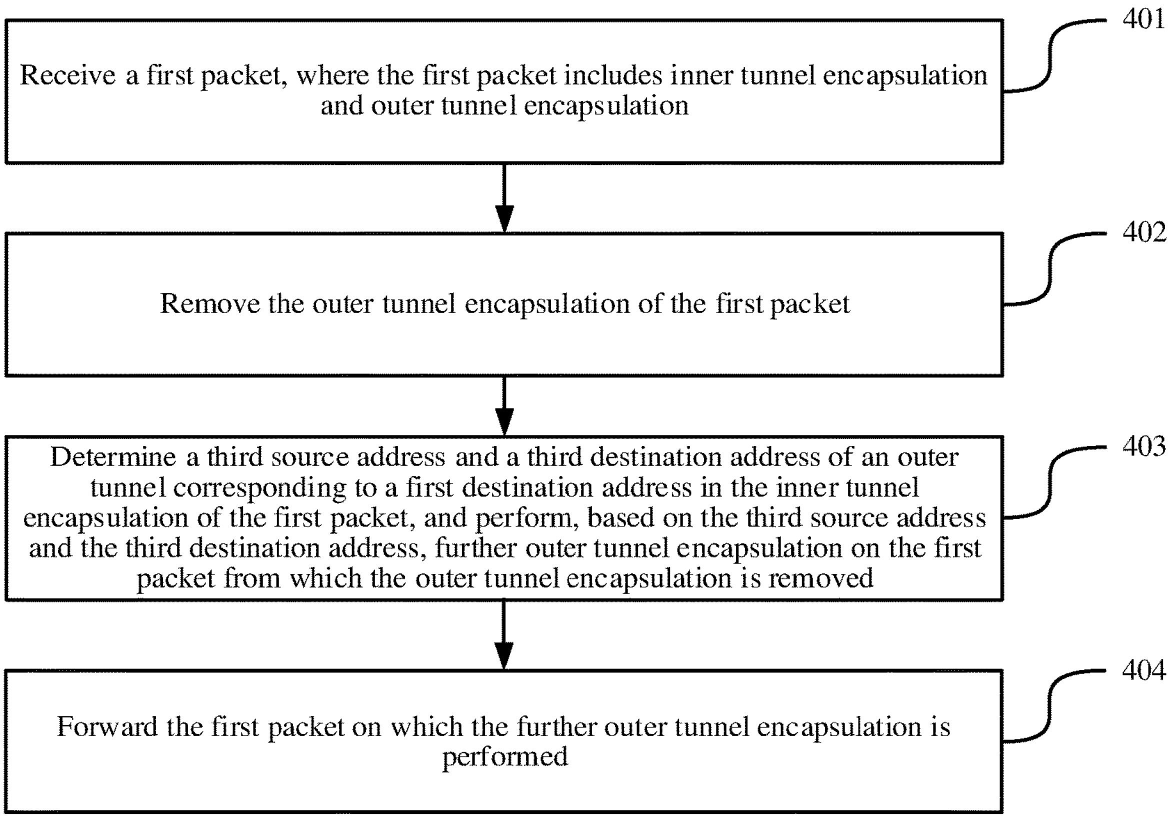
FIG. 10 is a flowchart of a packet forwarding method according to an embodiment of this application.

The following describes a processing procedure of packet forwarding by a GW in an SD-WAN networking scenario shown in FIG. 9. Refer to FIG. 10. The processing procedure of packet forwarding by the GW may include the following steps.

S401. Receive a first packet, where the first packet includes inner tunnel encapsulation and outer tunnel encapsulation.

In an implementation, the GW may receive a first packet that is sent by the first CPE and on which inner tunnel encapsulation and outer tunnel encapsulation are performed.

S402. Remove the outer tunnel encapsulation of the first packet.

In an implementation, the GW may remove, based on a protocol of the outer tunnel, the outer tunnel encapsulation from the first packet on which the inner tunnel encapsulation and the outer tunnel encapsulation are performed. The protocol of the outer tunnel may be a GRE over IPsec protocol.

S403. Determine a third source address and a third destination address of an outer tunnel corresponding to the first destination address in the inner tunnel encapsulation of the first packet, and perform, based on the third source address and the third destination address, further outer tunnel encapsulation on the first packet from which the outer tunnel encapsulation is removed.

In an implementation, the GW obtains the first destination address carried in the first packet from which the outer tunnel encapsulation is removed, and determines, by querying routing information, an egress port used to forward the packet. In addition, a third source address and a third destination address of an outer tunnel corresponding to the egress port are further obtained through query. The third source address of the outer tunnel is an IP address of the egress port that is in the GW and that is used to forward the first packet, and the third destination address is an IP address of a WAN port of a destination end (the second CPE) of the outer tunnel.

Then, based on the protocol of the outer tunnel, a VRF in the GW may perform further outer tunnel encapsulation on the first packet from which the outer tunnel encapsulation is removed. The first packet on which the further outer tunnel encapsulation is performed carries the third source address and the third destination address of the outer tunnel. In addition, when the further outer tunnel encapsulation is performed, in addition to the third source address and the third destination address of the outer tunnel, a VRF identifier of the VRF that performs the further outer tunnel encapsulation is further encapsulated.

S404. Forward the first packet on which the further outer tunnel encapsulation is performed.

In an implementation, the GW forwards the first packet on which the further outer tunnel encapsulation is performed to the second CPE through the egress port.

Figure 11:
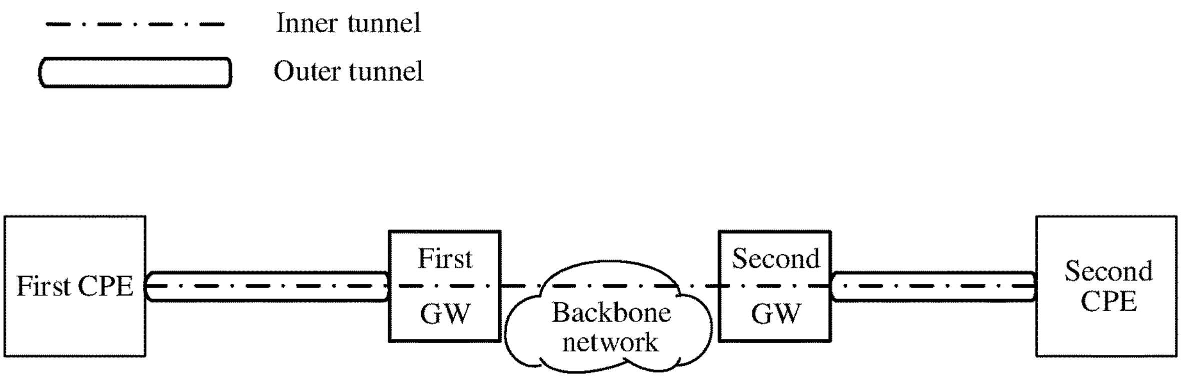
FIG. 11 is a diagram of SD-WAN networking according to an embodiment of this application.
Figure 12:
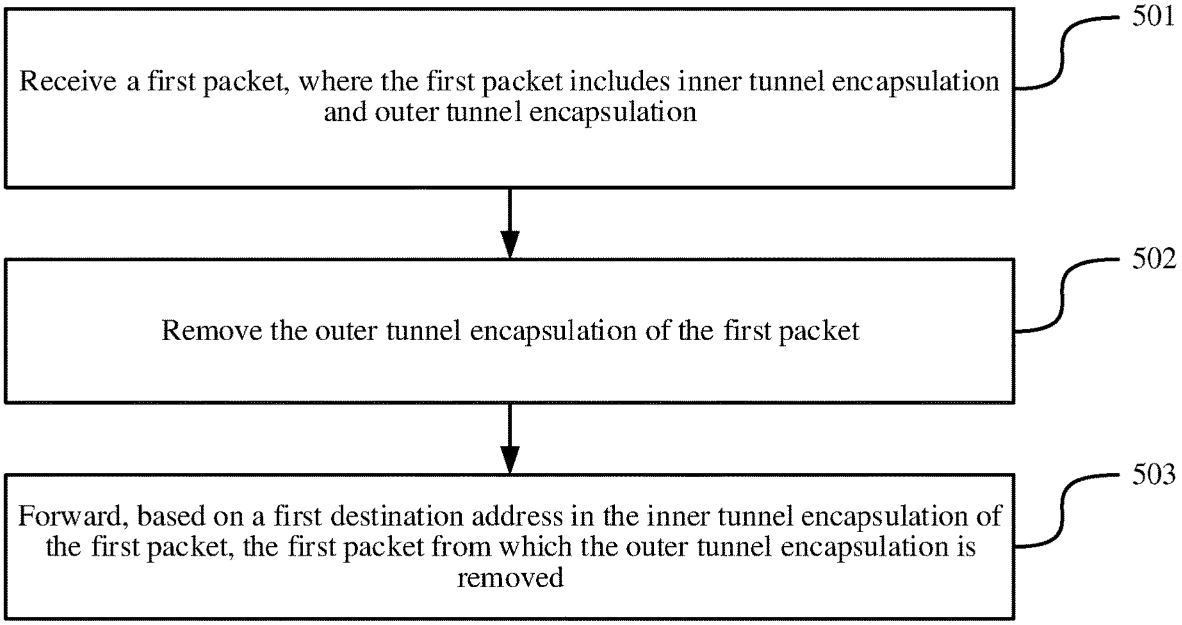
FIG. 12 is a flowchart of a packet forwarding method according to an embodiment of this application.

The following describes a processing procedure of packet forwarding by a first GW in an SD-WAN networking scenario shown in FIG. 11. Refer to FIG. 12. The processing procedure of packet forwarding by the first GW may include the following steps.

S501. Receive a first packet, where the first packet includes inner tunnel encapsulation and outer tunnel encapsulation.

A first source address in the inner tunnel encapsulation is an IP address of a port in the first CPE. For example, when the first CPE is the CPE shown in FIG. 2, FIG. 3, FIG. 5, or FIG. 7, the first source address is the IP address of the first WAN port in FIG. 2, or the IP address of the first loopback port in FIG. 3, or the IP address of the loopback port in FIG. 5 or FIG. 7. A first destination address is an IP address of a port in the second CPE. For example, when the second CPE is the CPE shown in FIG. 2, FIG. 3, FIG. 5, or FIG. 7, the first destination address is the IP address of the first WAN port in FIG. 2, or the IP address of the first loopback port in FIG. 3, or the IP address of the loopback port in FIG. 5 or FIG. 7. A second source address in the outer tunnel encapsulation is an IP address of a port in the first CPE, for example, the IP address of the second WAN port in FIG. 2 or FIG. 3, or the IP address of WAN port in FIG. 5 or FIG. 7. A second destination address is an IP address of a port in the first GW, for example, an IP address of a WAN port in the first GW.

S502. Remove the outer tunnel encapsulation of the first packet.

S503. Forward, based on the first destination address in the inner tunnel encapsulation of the first packet, the first packet from which the outer tunnel encapsulation is removed.

In an implementation, the GW determines, by querying routing information, a next-hop address corresponding to the first destination address, and forwards, based on the next-hop address, the first packet from which the outer tunnel encapsulation is removed.

Herein, it should be noted that implementations of S501 and S502 are respectively the same as or similar to implementations of S401 and S402 shown in FIG. 10. Details are not described herein again.

Figure 13:
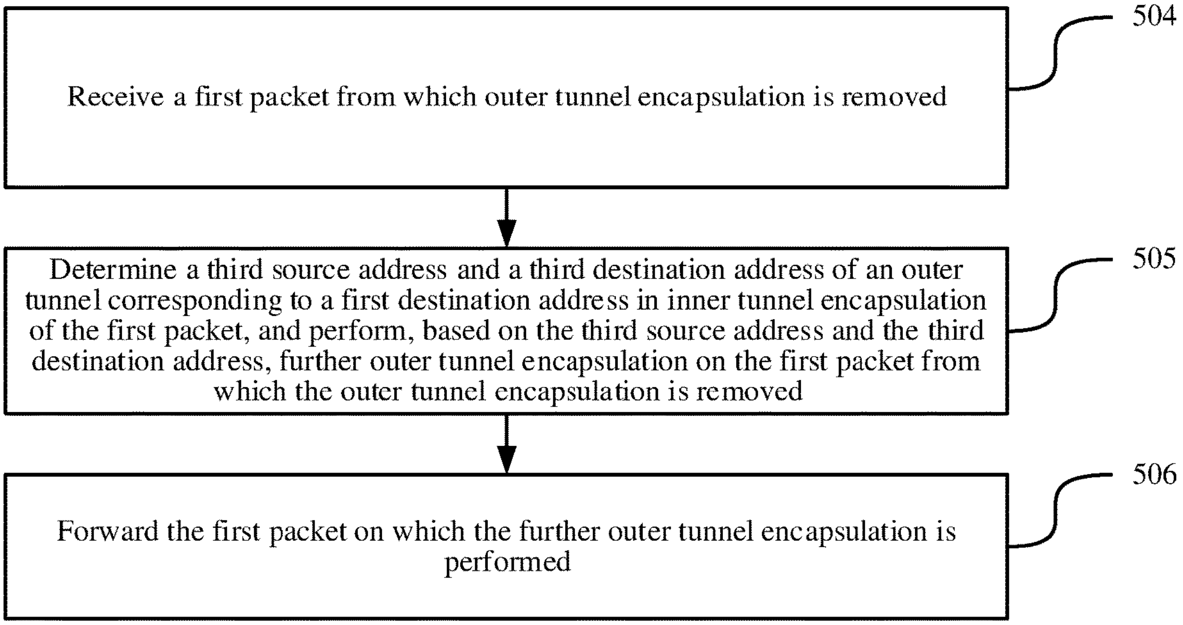
FIG. 13 is a flowchart of a packet forwarding method according to an embodiment of this application.

The following describes a processing procedure of packet forwarding by a second GW in the SD-WAN networking scenario shown in FIG. 11. Refer to FIG. 13. The processing procedure of packet forwarding by the second GW may include the following steps.

S504. Receive the first packet from which the outer tunnel encapsulation is removed.

In an implementation, the second GW receives the first packet that is sent by the first GW and forwarded through a backbone network and from which the outer tunnel encapsulation is removed.

S505. Determine a third source address and a third destination address of an outer tunnel corresponding to the first destination address in the inner tunnel encapsulation of the first packet, and perform, based on the third source address and the third destination address, further outer tunnel encapsulation on the first packet from which the outer tunnel encapsulation is removed.

As shown in FIG. 11, the third source address is an IP address of a port at a source end (the second GW) of an outer tunnel between the second GW and the second CPE, and the third destination address is an IP address of a port at a destination end (the second CPE) of the outer tunnel. Both the port of the second GW and the port of the second CPE may be a WAN port.

S506. Forward the first packet on which the further outer tunnel encapsulation is performed.

Herein, it should be noted that implementations of S505 and S506 are respectively the same as or similar to implementations of S403 and S404 shown in FIG. 10. Details are not described herein again.

Figure 14:
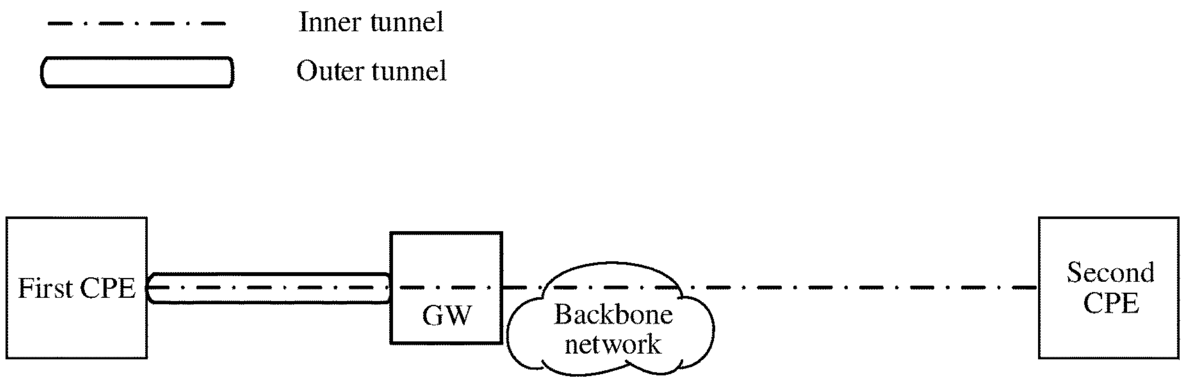
FIG. 14 is a diagram of SD-WAN networking according to an embodiment of this application.

A processing procedure of packet forwarding by a GW in an SD-WAN networking scenario shown in FIG. 14 is the same as the procedure of packet forwarding by the first GW shown in FIG. 11. Details are not described herein again.

Figure 15:
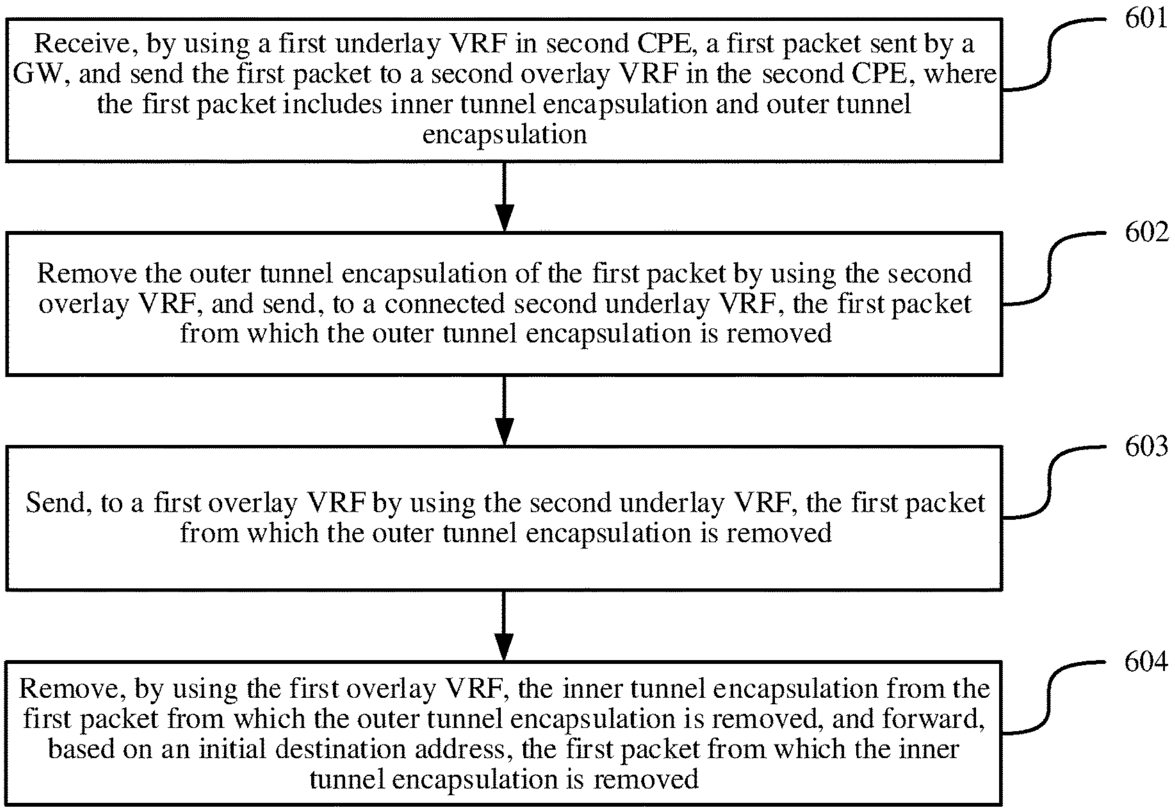
FIG. 15 is a flowchart of a packet forwarding method according to an embodiment of this application.

The following uses the CPE shown in FIG. 2 or FIG. 3 as the second CPE on the receiving side to describe a processing procedure of packet forwarding by the second CPE. Refer to FIG. 15. The processing procedure of packet forwarding by the second CPE may include the following steps.

S601. Receive, by using a first underlay VRF in the second CPE, a first packet sent by the GW, and send the first packet to a second overlay VRF in the second CPE, where the first packet includes inner tunnel encapsulation and outer tunnel encapsulation.

In an implementation, a second WAN port that is in the second CPE and that corresponds to the third destination address receives the first packet on which the further outer encapsulation is performed.

Herein, it should be noted that when performing the inner encapsulation on the first packet, the first overlay VRF in the first CPE encapsulates the VRF identifier of the first overlay VRF into the first packet, and the VRF identifier of the first overlay VRF in the first CPE is the same as a VRF identifier of a first overlay VRF in the second CPE. Similarly, when performing the further outer tunnel encapsulation on the first packet from which the outer tunnel encapsulation is removed, the GW encapsulates, into the first packet, the VRF identifier of the VRF that is in the GW and that performs the further outer tunnel encapsulation, and the VRF identifier of the VRF in the GW is the same as a VRF identifier of the second overlay VRF in the second CPE, and is also the same as the VRF identifier of the second overlay VRF in the first CPE.

If determining that a VRF identifier in the outer tunnel encapsulation of the first packet is the identifier of the second overlay VRF, the first underlay VRF associated with the second WAN port sends the first packet on which the further outer tunnel encapsulation is performed to the second overlay VRF.

S602. Remove the outer tunnel encapsulation of the first packet by using the second overlay VRF, and send, to a connected second underlay VRF, the first packet from which the outer tunnel encapsulation is removed.

In an implementation, the second overlay VRF removes, based on a preconfigured protocol of the outer tunnel, the outer tunnel encapsulation from the obtained first packet on which the further outer tunnel encapsulation is performed, and forwards, to the connected second underlay VRF, the first packet from which the outer tunnel encapsulation is removed.

S603. Send, to the first overlay VRF by using the second underlay VRF, the first packet from which the outer tunnel encapsulation is removed.

In an implementation, if determining that a VRF identifier in the inner tunnel encapsulation of the first packet from which the outer tunnel encapsulation is removed is the identifier of the first overlay VRF, the second overlay VRF sends, to the first overlay VRF, the first packet from which the outer tunnel encapsulation is removed.

S604. Remove, by using the first overlay VRF, the inner tunnel encapsulation from the first packet from which the outer tunnel encapsulation is removed, and forward, based on an initial destination address, the first packet from which the inner tunnel encapsulation is removed.

In an implementation, after obtaining the first packet from which the outer tunnel encapsulation is removed, the first overlay VRF removes, based on a preconfigured protocol of the inner tunnel, the inner tunnel encapsulation from the first packet from which the outer tunnel encapsulation is removed. Then, the first overlay VRF obtains the initial destination address carried in the first packet from which the inner tunnel encapsulation is removed, queries routing information to determine a next-hop address corresponding to the initial destination address, and forwards, based on the next-hop address, the first packet from which the inner tunnel encapsulation is removed.

Figure 16:
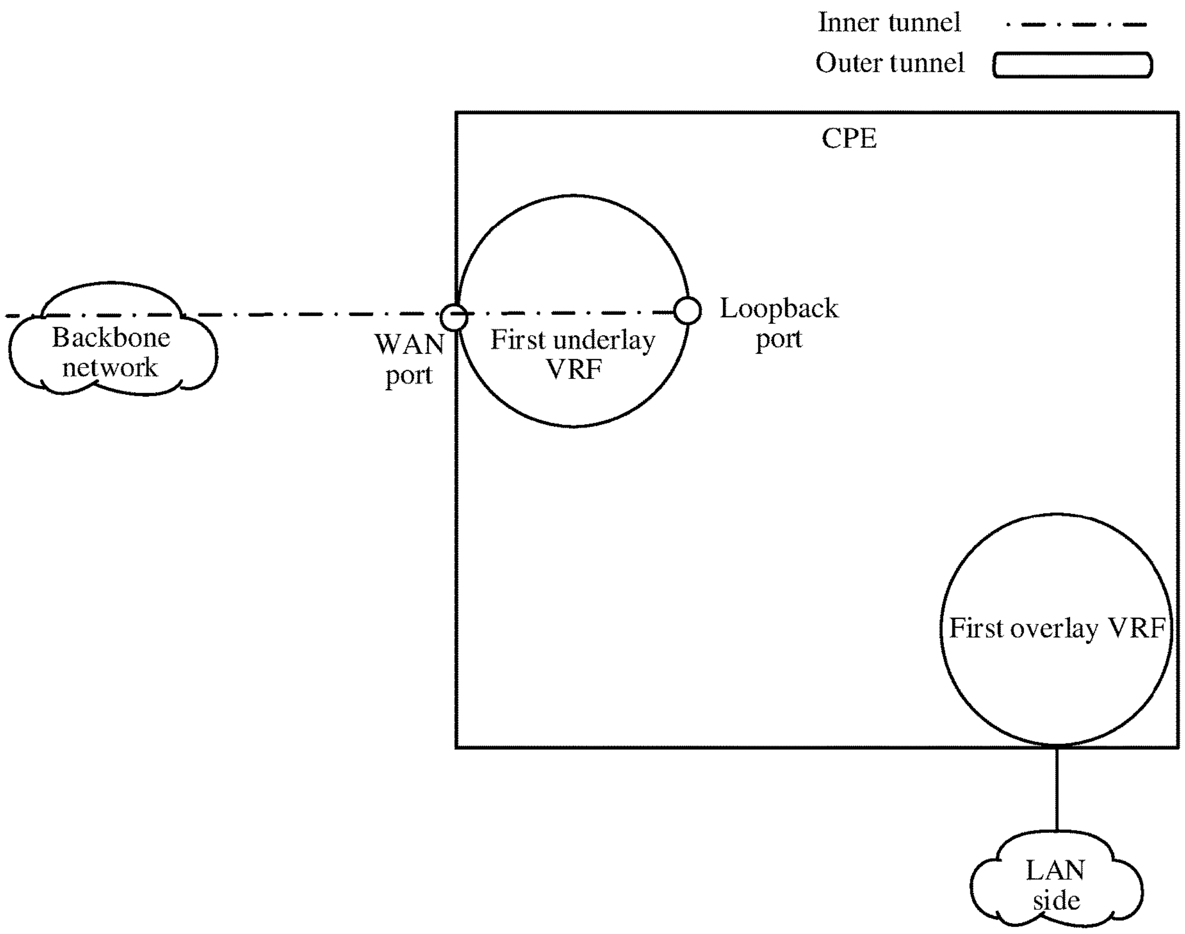
FIG. 16 is a diagram of CPE according to an embodiment of this application.
Figure 17:
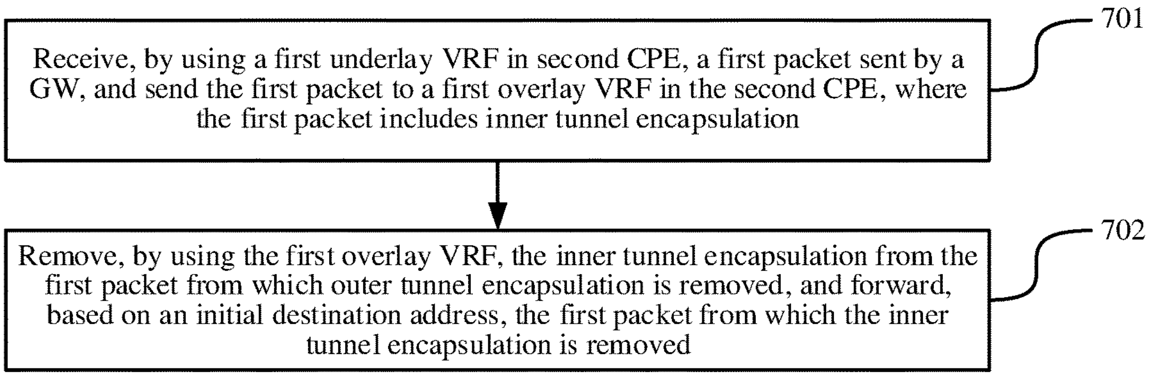
FIG. 17 is a flowchart of a packet forwarding method according to an embodiment of this application.

The following uses CPE shown in FIG. 16 as the second CPE on the receiving side to describe a processing procedure of packet forwarding by the second CPE. It should be noted that, the CPE shown in FIG. 16 is not connected to a GW, but directly accesses a backbone network. Corresponding to a case in which the first packet is forwarded by the GW shown in FIG. 14, a packet received by the CPE is the first packet from which the outer tunnel encapsulation is removed. Refer to FIG. 17. The processing procedure of packet forwarding by the second CPE may include the following steps.

S701. Receive, by using a first underlay VRF in the second CPE, a first packet sent by the GW, and send the first packet to a first overlay VRF in the second CPE, where the first packet includes inner tunnel encapsulation.

In an implementation, a WAN port that is in the second CPE and that corresponds to the first destination address receives the first packet from which the outer encapsulation is removed. If determining that the VRF identifier in the inner tunnel encapsulation of the first packet is an identifier of the first overlay VRF, the first underlay VRF associated with the WAN port sends, to the first overlay VRF, the first packet from which the outer tunnel encapsulation is removed.

S702. Remove, by using the first overlay VRF, the inner tunnel encapsulation from the first packet from which the outer tunnel encapsulation is removed, and forward, based on an initial destination address, the first packet from which the inner tunnel encapsulation is removed.

In an implementation, after obtaining the first packet from which the outer tunnel encapsulation is removed, the first overlay VRF removes, based on a preconfigured protocol of the inner tunnel, the inner tunnel encapsulation from the first packet from which the outer tunnel encapsulation is removed. Then, the first overlay VRF obtains the initial destination address carried in the first packet from which the inner tunnel encapsulation is removed, queries routing information to determine a next-hop address corresponding to the initial destination address, and forwards, based on the next-hop address, the first packet from which the inner tunnel encapsulation is removed.

Figure 19:
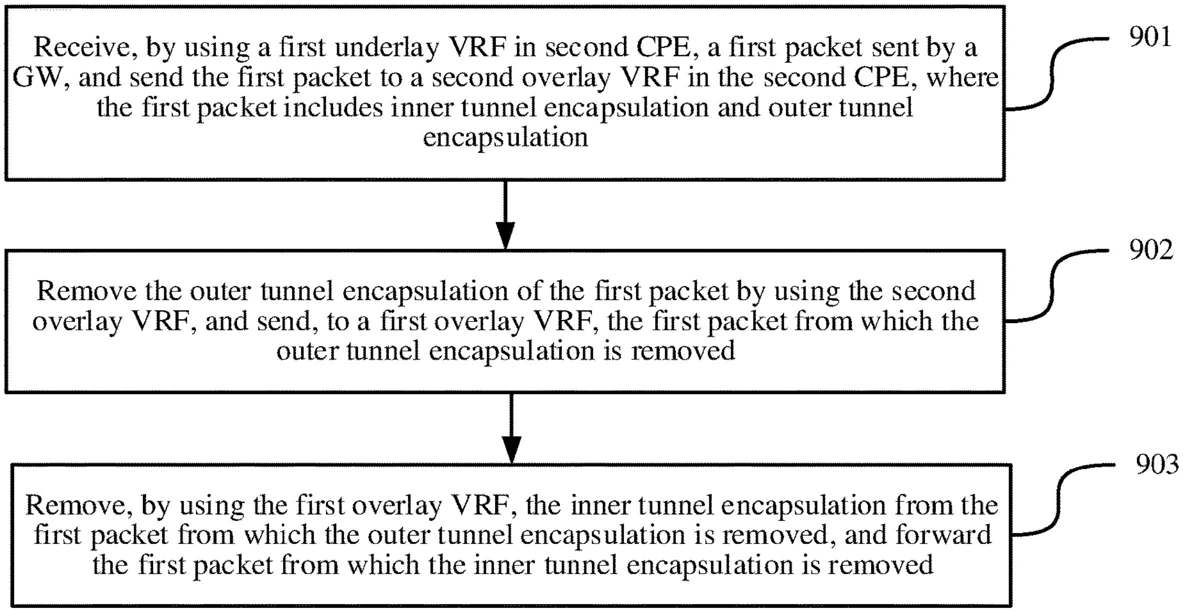
FIG. 19 is a flowchart of a packet forwarding method according to an embodiment of this application.

The following uses the CPE shown in FIG. 5 as the second CPE on the receiving side to describe a processing procedure of packet forwarding by the second CPE. It should be noted that, the second CPE shown in FIG. 5 is connected to a GW to access a backbone network. Corresponding to a case in which the first packet is forwarded by the GW shown in FIG. 9 or FIG. 11, a packet received by the CPE is the first packet on which the further outer tunnel encapsulation is performed. Refer to FIG. 19. The processing procedure of packet forwarding by the second CPE may include the following steps.

S901. Receive, by using a first underlay VRF in the second CPE, a first packet sent by the GW, and send the first packet to a second overlay VRF in the second CPE, where the first packet includes inner tunnel encapsulation and outer tunnel encapsulation.

In an implementation, a WAN port that is in the second CPE and that corresponds to the third destination address receives the first packet on which the further outer encapsulation is performed.

Herein, it should be noted that the VRF identifier of the first overlay VRF in the first CPE is the same as a VRF identifier of a first overlay VRF in the second CPE. The VRF identifier of the VRF that is in the GW and that performs a task of the further outer tunnel encapsulation is the same as a VRF identifier of the second overlay VRF in the second CPE.

If determining that a VRF identifier in the outer tunnel encapsulation of the first packet is the VRF identifier of the second overlay VRF, the first underlay VRF associated with the WAN port forwards the first packet to the second overlay VRF.

S902. Remove the outer tunnel encapsulation of the first packet by using the second overlay VRF, and send, to the first overlay VRF, the first packet from which the outer tunnel encapsulation is removed.

In an implementation, the second overlay VRF removes the outer tunnel encapsulation of the first packet based on a preconfigured tunneling protocol of the outer tunnel. Then, if determining that a VRF identifier in the inner tunnel encapsulation of the first packet from which the outer tunnel encapsulation is removed is the VRF identifier of the first overlay VRF, the first underlay VRF forwards, to the first overlay VRF, the first packet from which the outer tunnel encapsulation is removed.

S903. Remove, by using the first overlay VRF, the inner tunnel encapsulation from the first packet from which the outer tunnel encapsulation is removed, and forward the first packet from which the inner tunnel encapsulation is removed.

In an implementation, after obtaining the first packet from which the outer tunnel encapsulation is removed, the first overlay VRF removes, based on a preconfigured protocol of the inner tunnel, the inner tunnel encapsulation from the first packet from which the outer tunnel encapsulation is removed. Then, the first overlay VRF obtains the initial destination address carried in the first packet from which the inner tunnel encapsulation is removed, queries routing information to determine a next-hop address corresponding to the initial destination address, and forwards, based on the next-hop address, the first packet from which the inner tunnel encapsulation is removed.

Figure 18:
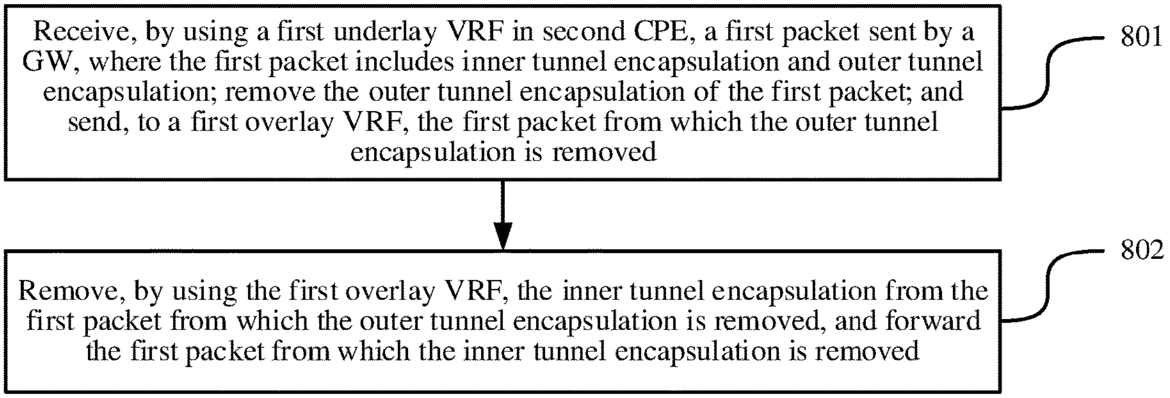
FIG. 18 is a flowchart of a packet forwarding method according to an embodiment of this application.

The following uses the CPE shown in FIG. 7 as the second CPE on the receiving side to describe a processing procedure of packet forwarding by the second CPE. It should be noted that, the CPE shown in FIG. 7 is connected to a GW to access a backbone network. Corresponding to a case in which the first packet is forwarded by the GW shown in FIG. 9 or FIG. 11, a packet received by the CPE is the first packet on which the further outer tunnel encapsulation is performed. Refer to FIG. 18. The processing procedure of packet forwarding by the second CPE may include the following steps.

S801. Receive, by using a first underlay VRF in the second CPE, a first packet sent by the GW, where the first packet includes inner tunnel encapsulation and outer tunnel encapsulation; remove the outer tunnel encapsulation of the first packet; and send, to a first overlay VRF, the first packet from which the outer tunnel encapsulation is removed.

In an implementation, a WAN port that is in the second CPE and that corresponds to the third destination address receives the first packet on which the further outer encapsulation is performed.

Herein, it should be noted that the VRF identifier of the first overlay VRF in the first CPE is the same as a VRF identifier of the first overlay VRF in the second CPE. Similarly, when performing the further outer tunnel encapsulation on the first packet from which the outer tunnel encapsulation is removed, the GW encapsulates, into the first packet, the VRF identifier of the VRF that is in the GW and that performs the further outer tunnel encapsulation, and the VRF identifier of the VRF in the GW is the same as a VRF identifier of the first overlay VRF in the second CPE, and is also the same as the VRF identifier of the first overlay VRF in the first CPE.

If determining that the VRF identifier in the outer tunnel encapsulation of the first packet is the same as a VRF identifier of the first underlay VRF, the first underlay VRF associated with the WAN port removes the outer tunnel encapsulation of the first packet based on a preconfigured tunneling protocol of the outer tunnel. Then, if determining that the VRF identifier in the inner tunnel encapsulation of the first packet from which the outer tunnel encapsulation is removed is the VRF identifier of the first overlay VRF, the first underlay VRF forwards, to the first overlay VRF, the first packet from which the outer tunnel encapsulation is removed.

S802. Remove, by using the first overlay VRF, the inner tunnel encapsulation from the first packet from which the outer tunnel encapsulation is removed, and forward the first packet from which the inner tunnel encapsulation is removed.

In an implementation, after obtaining the first packet from which the outer tunnel encapsulation is removed, the first overlay VRF removes, based on a preconfigured protocol of the inner tunnel, the inner tunnel encapsulation from the first packet from which the outer tunnel encapsulation is removed. Then, the first overlay VRF obtains the initial destination address carried in the first packet from which the inner tunnel encapsulation is removed, queries routing information to determine a next-hop address corresponding to the initial destination address, and forwards, based on the next-hop address, the first packet from which the inner tunnel encapsulation is removed.

Figure 20:
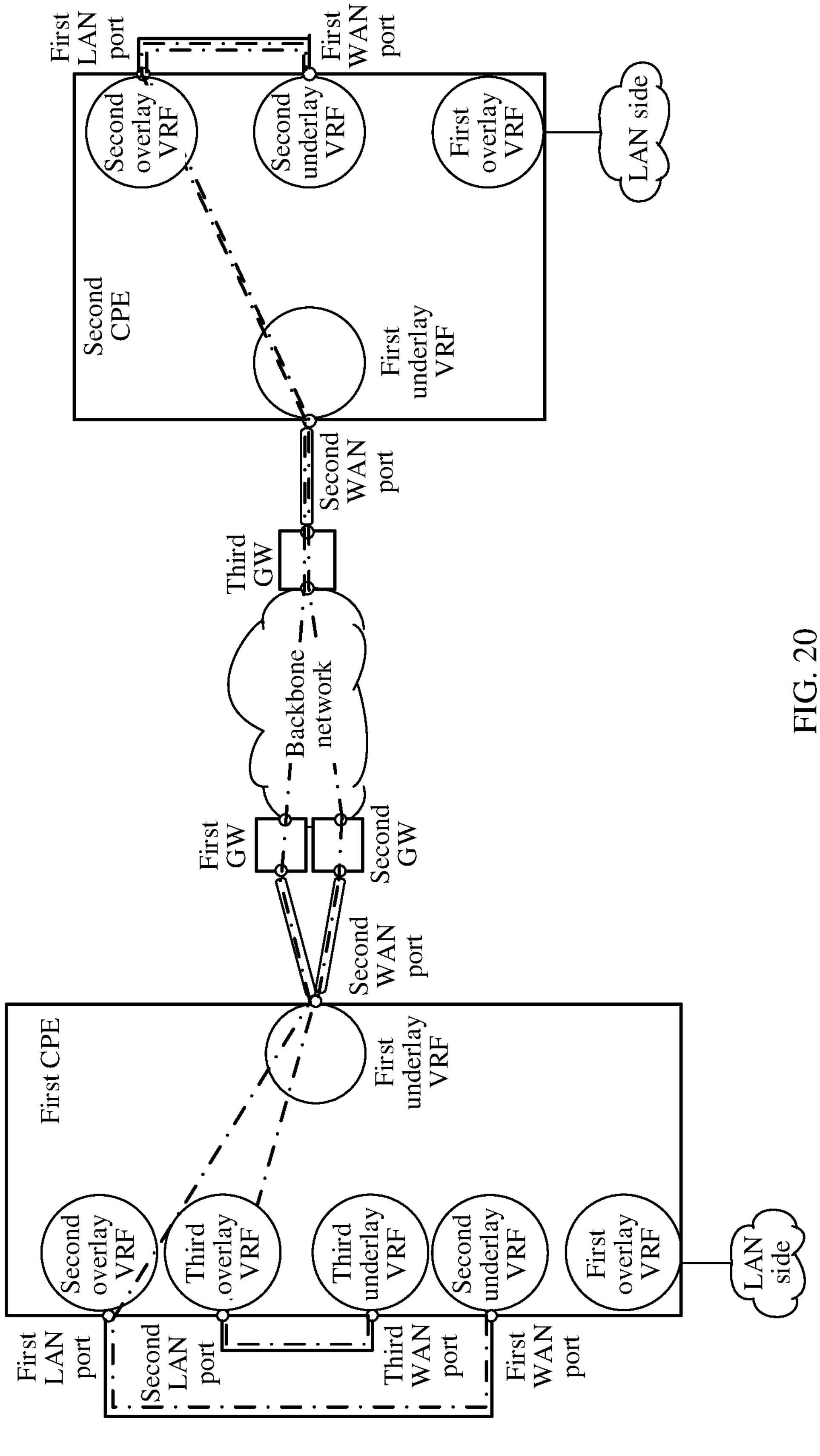
FIG. 20 is a diagram of SD-WAN networking according to an embodiment of this application.

In an implementation, embodiments of this application may also be applied to a scenario shown in FIG. 20, where first CPE is connected to two GWs, second CPE is connected to one GW, and the first CPE establishes an inner tunnel to the second CPE by using a first GW and a third GW. A first overlay VRF, a second overlay VRF, a third overlay VRF, a first underlay VRF, a second underlay VRF, and a third underlay VRF are deployed in the first CPE. A first LAN port associated with the second overlay VRF and a first WAN port associated with the second underlay VRF are connected by using a physical line, a second LAN port associated with the third overlay VRF and a third WAN port associated with the third underlay VRF are connected by using a physical line, and a second WAN port is associated with the first underlay VRF. A first overlay VRF, a second overlay VRF, a first underlay VRF, and a second underlay VRF are deployed in the second CPE, and a first LAN port associated with the second overlay VRF and a first WAN port associated with the second underlay VRF are connected by using a physical line.

In this scenario, there are two end-to-end tunnels between the first CPE and the second CPE. Therefore, when the first CPE sends a packet to the second CPE, the first overlay VRF in the first CPE may implement load sharing in the two tunnels based on an equal-cost multi-path (ECMP) protocol. Certainly, if there is another end-to-end tunnel between the first CPE and the second CPE, when the first CPE sends a packet to the second CPE, the first overlay VRF may implement load sharing in various end-to-end tunnels between the first CPE and the second CPE based on the ECMP protocol.

In addition, it should be noted that the second overlay VRF and the second underlay VRF may alternatively be connected in the inner loop connection manner shown in FIG. 3. Similarly, the third overlay VRF and the third underlay VRF may alternatively be connected in the inner loop connection manner shown in FIG. 3. Similarly, the second overlay VRF and the second underlay VRF in the second CPE may alternatively be connected in the inner loop connection manner shown in FIG. 3.

When the packet is forwarded, processing of the first CPE in FIG. 20 is the same as or similar to the processing procedure, shown in FIG. 4, of packet forwarding by the CPE. Details are not described herein again. Processing of the first GW and the third GW in FIG. 20 is the same as or similar to the processing procedure, shown in FIG. 12, of packet forwarding by the first GW. Details are not described herein again. Processing of the third GW in FIG. 20 is the same as or similar to the processing procedure, shown in FIG. 14, of packet forwarding by the second GW. Details are not described herein again.

Figure 21:
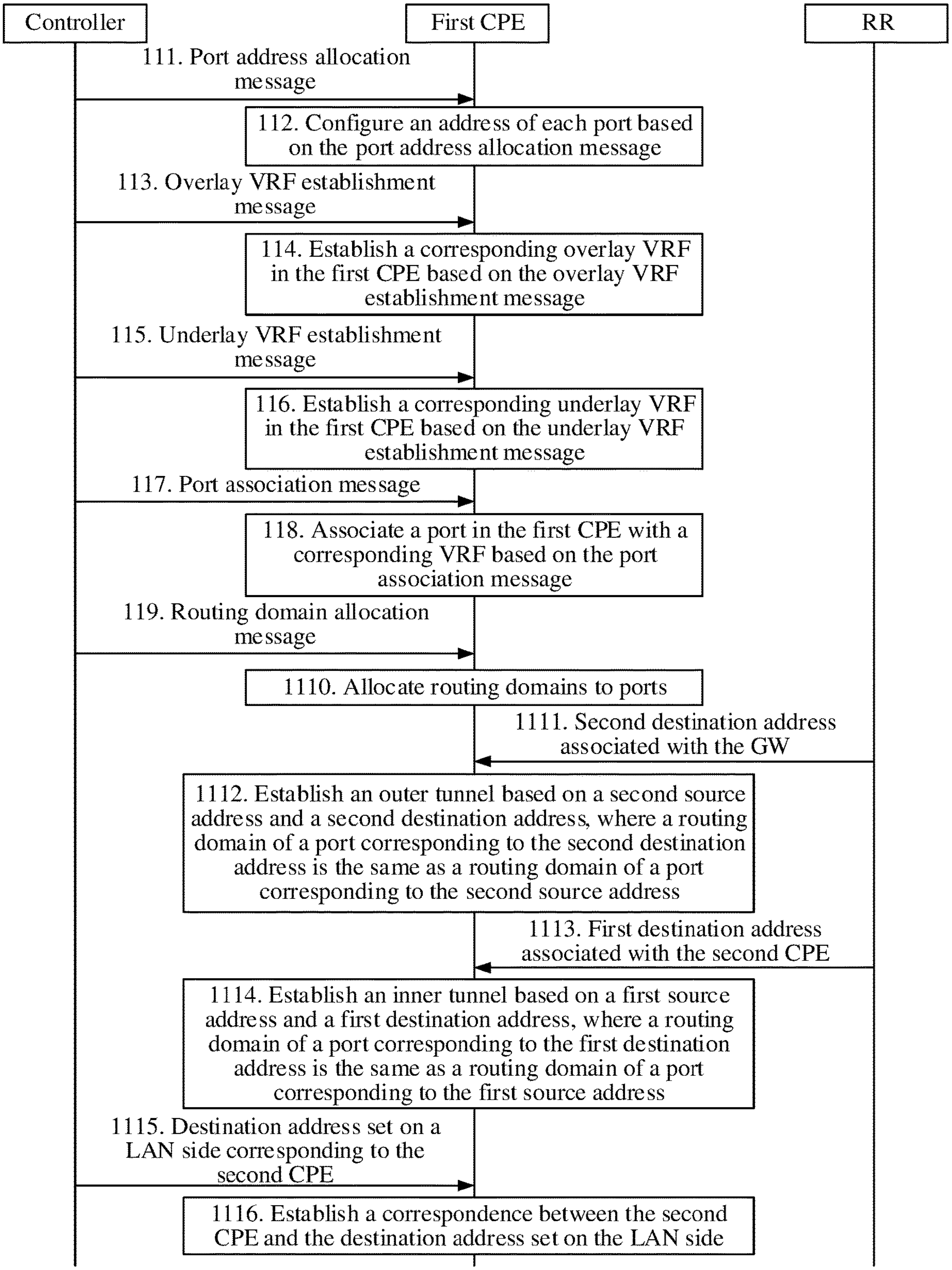
FIG. 21 is a flowchart of a CPE configuration method according to an embodiment of this application.

Before the packet forwarding method is implemented, the CPE needs to be configured. Refer to FIG. 21. The CPE shown in FIG. 2 and FIG. 3 may be configured as follows:

S111. A controller sends a port address allocation message to first CPE.

In an implementation, the controller may specify an IP address of each port in the first CPE. For the CPE shown in FIG. 2, the controller may specify IP addresses of the first WAN port, the first LAN port, and the second WAN port. For the CPE shown in FIG. 3, the controller may specify IP addresses of the first loopback port, the second loopback port, and the second WAN port.

S112. The first CPE configures the address of each port based on the port address allocation message.

In an implementation, the first CPE may configure, based on IP address information carried in the port address allocation message, IP addresses for the first WAN port, the first LAN port, and the second WAN port shown in FIG. 2. Alternatively, IP addresses are configured for the first loopback port, the second loopback port, and the second WAN port shown in FIG. 3.

S113. The controller sends an overlay VRF establishment message to the first CPE.

In an implementation, for the cases shown in FIG. 2 and FIG. 3, the overlay VRF establishment message may carry a VRF identifier of the first overlay VRF and a VRF identifier of the second overlay VRF.

For the case shown in FIG. 5, the overlay VRF establishment message may carry a VRF identifier of the first overlay VRF and a VRF identifier of the second overlay VRF.

For the case shown in FIG. 7, the overlay VRF establishment message may carry a VRF identifier of the first overlay VRF.

For the case shown in FIG. 20, the overlay VRF establishment message may carry a VRF identifier of the first overlay VRF, a VRF identifier of the second overlay VRF, and a VRF identifier of the third overlay VRF.

S114. The first CPE establishes a corresponding overlay VRF in the first CPE based on the overlay VRF establishment message.

In an implementation, for the cases shown in FIG. 2 and FIG. 3, the first CPE establishes the first overlay VRF and the second overlay VRF in the first CPE.

For the case shown in FIG. 5, the first CPE establishes the first overlay VRF and the second overlay VRF in the first CPE.

For the case shown in FIG. 7, the first CPE establishes the first overlay VRF in the first CPE.

For the case shown in FIG. 20, the first CPE establishes the first overlay VRF, the second overlay VRF, and the third overlay VRF in the first CPE.

S115. The controller sends an underlay VRF establishment message to the first CPE.

In an implementation, for the cases shown in FIG. 2 and FIG. 3, the underlay VRF establishment message carries a VRF identifier of the first underlay VRF and a VRF identifier of the second underlay VRF.

For the case shown in FIG. 5, the underlay VRF establishment message carries a VRF identifier of the first underlay VRF.

For the case shown in FIG. 7, the underlay VRF establishment message carries a VRF identifier of the first underlay VRF.

For the case shown in FIG. 20, the underlay VRF establishment message carries a VRF identifier of the first underlay VRF, a VRF identifier of the second underlay VRF, and a VRF identifier of the third underlay VRF.

S116. The first CPE establishes a corresponding underlay VRF in the first CPE based on the underlay VRF establishment message.

In an implementation, for the cases shown in FIG. 2 and FIG. 3, the first CPE establishes the first underlay VRF and the second underlay VRF in the first CPE.

For the case shown in FIG. 5, the first CPE establishes the first underlay VRF in the first CPE.

For the case shown in FIG. 7, the first CPE establishes the first underlay VRF in the first CPE.

For the case shown in FIG. 20, the first CPE establishes the first underlay VRF, the second underlay VRF, and the third underlay VRF in the first CPE.

S117. The controller sends a port association message to the first CPE, where the port association message includes an identifier of a port corresponding to a first source address and a corresponding VRF identifier, and an identifier of a port corresponding to a second source address and a corresponding VRF identifier.

In an implementation, for the case shown in FIG. 2, in the port association message, the port corresponding to the first source address is the first WAN port, the corresponding VRF identifier is the VRF identifier of the second underlay VRF, the port corresponding to the second source address is the second WAN port, and the corresponding VRF identifier is the VRF identifier of the first underlay VRF. In addition, the port association message may further carry an identifier of the first LAN port and the VRF identifier of the second overlay VRF.

For the case shown in FIG. 3, in the port association message, the port corresponding to the first source address is the first loopback port, the corresponding VRF identifier is the VRF identifier of the second underlay VRF, the port corresponding to the second source address is the second WAN port, and the corresponding VRF identifier is the VRF identifier of the first underlay VRF. In addition, the port association message may further carry an identifier of the second loopback port and the VRF identifier of the second overlay VRF.

For the case shown in FIG. 5, in the port association message, the port corresponding to the first source address is the loopback port, the corresponding VRF identifier is the VRF identifier of the second overlay VRF, the port corresponding to the second source address is the WAN port, and the corresponding VRF identifier is the VRF identifier of the first underlay VRF.

For the case shown in FIG. 7, in the port association message, the port corresponding to the first source address is the loopback port, the corresponding VRF identifier is the VRF identifier of the first underlay VRF, the port corresponding to the second source address is the WAN port, and the corresponding VRF identifier is also the VRF identifier of the first underlay VRF.

For the case shown in FIG. 20, in the port association message, the port corresponding to the first source address is the first WAN port, and the corresponding VRF identifier is the VRF identifier of the second underlay VRF. Alternatively, in the port association message, the port corresponding to the first source address is the third WAN port, and the corresponding VRF identifier is the VRF identifier of the third underlay VRF. The port corresponding to the second source address is the second WAN port, and the corresponding VRF identifier is the VRF identifier of the first underlay VRF. In addition, the port association message may further carry an identifier of the first LAN port, the VRF identifier of the second overlay VRF, an identifier of the second LAN port, and the VRF identifier of the third overlay VRF.

S118. The first CPE associates a port in the first CPE with a corresponding VRF based on the port association message.

In an implementation, for the case shown in FIG. 2, the first CPE associates the first WAN port with the second underlay VRF, associates the second WAN port with the first underlay VRF, and associates the first LAN port with the second overlay VRF.

For the case shown in FIG. 3, the first CPE associates the first loopback port with the second underlay VRF, associates the second WAN port with the first underlay VRF, and associates the second loopback port with the second overlay VRF.

For the case shown in FIG. 5, the first CPE associates the loopback port with the second overlay VRF, and associates the WAN port with the first underlay VRF.

For the case shown in FIG. 7, the first CPE associates the loopback port with the first underlay VRF, and also associates the WAN port with the first underlay VRF.

For the case shown in FIG. 20, the first CPE associates the first WAN port with the second underlay VRF, associates the second WAN port with the first underlay VRF, associates the third WAN port with the third underlay VRF, associates the first LAN port with the second overlay VRF, and associates the second LAN port with the third overlay VRF.

Then, in the case shown in FIG. 2, the first CPE may establish an outer loop physical line connection for the second overlay VRF and the second underlay VRF. In the case shown in FIG. 3, the first CPE may establish an inner loop tunnel between loopback ports of the second overlay VRF and the second underlay VRF. In the case shown in FIG. 20, the first CPE may establish an outer loop physical line connection for the second overlay VRF and the second underlay VRF, and may establish an outer loop physical line connection for the third overlay VRF and the third underlay VRF. Certainly, in the case shown in FIG. 20, a connection between the second overlay VRF and the second underlay VRF and a connection between the third overlay VRF and the third underlay VRF may alternatively be implemented by establishing an inner loop tunnel, or a connection may be implemented by establishing an outer loop physical line connection for one pair, and a connection may be implemented by establishing an inner loop tunnel for the other pair.

S119. The controller sends a routing domain allocation message to the first CPE.

In an implementation, a technical person configures, in the controller, routing domain allocation information corresponding to ports in the first CPE. The routing domain allocation information indicates routing domains allocated to the ports. The ports in the first CPE may include a WAN port and a loopback port, and the allocated routing domains may include backbone, Internet, and the like. Then, the controller delivers a routing domain allocation message to the first CPE. The routing domain allocation message carries port identifiers and corresponding routing domain identifiers.

S1110. The first CPE allocates the routing domains to the ports.

In an implementation, the first CPE allocates routing domains to each WAN port and loopback port based on the routing domain allocation message. The first source address and the second source address have different routing domains. For the case shown in FIG. 2, a routing domain of the first WAN port is different from a routing domain of the second WAN port. For example, the routing domain of the first WAN port may be backbone, and the routing domain of the second WAN port may be Internet. For the case shown in FIG. 3, a routing domain of the first loopback port is different from a routing domain of the second WAN port. For example, the routing domain of the first loopback port may be backbone, and the routing domain of the second WAN port may be Internet.

S1111. A route reflector (RR) sends a second destination address associated with a GW to the first CPE.

In an implementation, after the foregoing configuration is completed, each network device such as the first CPE, second CPE, and a GW may send an IP address of each port of the device, a corresponding routing domain identifier, and a device identifier to the RR. After receiving a message sent by the GW, the RR may send a routing domain corresponding to an IP address of a port, a device identifier, and the like of the GW to the first CPE.

S1112. The first CPE establishes an outer tunnel based on the second source address and the second destination address, where a routing domain of a port corresponding to the second destination address is the same as the routing domain of the port corresponding to the second source address.

The second source address is the IP address of the WAN port in the first CPE, and the second destination address is an IP address of a WAN port in the GW.

In an implementation, after receiving the IP address of the port, the corresponding routing domain, the device identifier, and the like of the GW that are sent by the RR, the first CPE attempts to establish a tunnel through ports in a same routing domain in the two devices. In this way, a tunnel, that is, the outer tunnel, is established between the port that is in the first CPE and that corresponds to the second source address and the port that is in the GW and that corresponds to the second destination address.

S1113. The RR sends, to the first CPE, a first destination address associated with second CPE.

The first destination address is an IP address of a WAN port or a loopback port in the second CPE.

In an implementation, after receiving an IP address of each port, a corresponding routing domain identifier, a device identifier, and the like that are sent by the second CPE, the RR may send the information to the first CPE.

S1114. The first CPE establishes an inner tunnel based on the first source address and the first destination address, where a routing domain of a port corresponding to the first destination address is the same as the routing domain of the port corresponding to the first source address.

In an implementation, after receiving the IP address of the port, the corresponding routing domain identifier, the device identifier, and the like of the second CPE that are sent by the RR, the first CPE attempts to establish a tunnel through ports in a same routing domain in the two devices. Because a connection is already established between the first CPE and the GW through the outer tunnel, the first CPE may establish, based on the outer tunnel, a tunnel, that is, the inner tunnel, between the port that is in the first CPE and that corresponds to the first source address and the port that is in the second CPE and that corresponds to the first destination address. The inner tunnel connects the first CPE and the second CPE by using the GW and a backbone network.

When the tunnel is established, each network device on a path on which the tunnel is located may learn and store routing information. For example, the first CPE may learn routing information of the inner tunnel in the first CPE. The routing information includes a correspondence between the first destination address and the second WAN port, and a correspondence between the second WAN port and the second source address and the second destination address. The GW may learn routing information of the inner tunnel in the GW, that is, a correspondence between the first destination address and a next-hop address.

S1115. The controller sends a destination address set on a LAN side corresponding to the second CPE to the first CPE.

In an implementation, the CPE may report an IP address of a terminal device on a corresponding LAN side and a device identifier of the CPE to the controller. For example, the second CPE may report an IP address of each terminal device on the LAN side and a device identifier of the second CPE to the controller. After receiving the information, the controller may send the information to another CPE. For example, the controller may send the IP address of each terminal device on the LAN side of the second CPE and the device identifier of the second CPE to the first CPE.

S1116. The first CPE establishes a correspondence between the second CPE and the destination address set on the LAN side.

In an implementation, after receiving the IP address of each terminal device on the LAN side of the second CPE and the device identifier of the second CPE, the first CPE may correspondingly store the device identifier of the second CPE and the IP address of each terminal device on the LAN side of the second CPE.

In this application, an end-to-end tunnel between two CPEs that passes through a backbone network can be established through the foregoing configuration.

Figure 22:
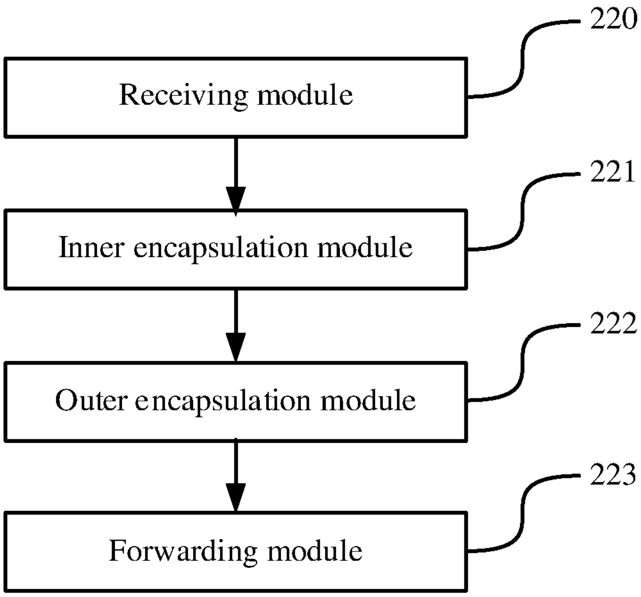
FIG. 22 is a diagram of a structure of a packet forwarding apparatus according to an embodiment of this application.

Based on a same technical concept, an embodiment of the present disclosure further provides a packet forwarding apparatus. The packet forwarding apparatus may be the CPE in FIG. 2, FIG. 3, FIG. 5, or FIG. 7. As shown in FIG. 22, the apparatus includes: a receiving module 220, an inner encapsulation module 221, an outer encapsulation module 222, and a forwarding module 223.

The receiving module 220 is configured to receive a first packet, and obtain an initial destination address of the first packet. For an implementation, refer to detailed descriptions of step S101 in the embodiment shown in FIG. 4, or detailed descriptions of step S201 in the embodiment shown in FIG. 6, or detailed descriptions of step S301 in the embodiment shown in FIG. 8. Details are not described herein again.

The inner encapsulation module 221 is configured to determine a first source address and a first destination address of an inner tunnel corresponding to the initial destination address, and perform inner tunnel encapsulation on the first packet based on the first source address and the first destination address. The inner tunnel is an end-to-end tunnel between first CPE and second CPE. For an implementation, refer to detailed descriptions of step S102 in the embodiment shown in FIG. 4, or detailed descriptions of step S202 in the embodiment shown in FIG. 6, or detailed descriptions of step S302 in the embodiment shown in FIG. 8. Details are not described herein again.

The outer encapsulation module 222 is configured to determine a second source address and a second destination address of an outer tunnel corresponding to the first destination address, and perform, based on the second source address and the second destination address, outer tunnel encapsulation on the first packet on which the inner tunnel encapsulation is performed. For an implementation, refer to detailed descriptions of steps S103 and S104 in the embodiment shown in FIG. 4, or detailed descriptions of steps S203 and S204 in the embodiment shown in FIG. 6, or detailed descriptions of step S303 in the embodiment shown in FIG. 8. Details are not described herein again.

The forwarding module 223 is configured to forward the first packet on which the outer tunnel encapsulation is performed.

In an implementation, the receiving module 220 is further configured to:

receive the second destination address sent by a route reflector RR, and establish the outer tunnel based on the second source address and the second destination address, where a routing domain of a port corresponding to the second destination address is the same as a routing domain of a port corresponding to the second source address;

receive the first destination address sent by the RR, and establish the inner tunnel based on the first source address and the first destination address, where a routing domain of a port corresponding to the first destination address is the same as a routing domain of a port corresponding to the first source address; and generate routing information of the inner tunnel in the first CPE, where the routing information includes a correspondence between the first destination address and the second source address and second destination address.

In an implementation, the receiving module 220 is further configured to:

receive an overlay VRF configuration message sent by a controller, and establish a first overlay VRF and a second overlay VRF in the first CPE;

receive an underlay VRF configuration message sent by the controller, and establish a first underlay VRF in the first CPE; and receive a port association message sent by the controller, associate the second overlay VRF with the port corresponding to the first source address, and associate the first underlay VRF with the port corresponding to second source address.

In an implementation, the inner encapsulation module 221 is configured to:

determine, by the first overlay VRF, the first source address and the first destination address of the inner tunnel corresponding to the initial destination address, and perform inner tunnel encapsulation on the first packet based on the first source address and the first destination address, where the inner tunnel is an end-to-end tunnel between the first CPE and the second CPE;

the inner encapsulation module 221 is further configured to:

send, by the first overlay VRF, the first packet on which the inner tunnel encapsulation is performed to the second overlay VRF corresponding to the first source address;

the outer encapsulation module 222 is further configured to:

determine, by the second overlay VRF, the second source address and the second destination address of the outer tunnel corresponding to the first destination address, and perform, based on the second source address and the second destination address, outer tunnel encapsulation on the first packet on which the inner tunnel encapsulation is performed;

the outer encapsulation module 222 is further configured to:

send, by the second overlay VRF, the first packet on which the outer tunnel encapsulation is performed to the first underlay VRF corresponding to the second source address; and the forwarding module 223 is configured to:

forward, by the first underlay VRF, the first packet on which the outer tunnel encapsulation is performed.

In an implementation, the receiving module 220 is further configured to:

receive an overlay VRF configuration message sent by a controller, and establish a first overlay VRF and a second overlay VRF in the first CPE;

receive an underlay VRF configuration message sent by the controller, and establish a first underlay VRF and a second underlay VRF in the first CPE; and receive a port association message sent by the controller, associate the second underlay VRF with the port corresponding to the first source address, and associate the first underlay VRF with the port corresponding to second source address.

In an implementation, the inner tunnel encapsulation module 221 is configured to:

determine, by the first overlay VRF, the first source address and the first destination address of the inner tunnel corresponding to the initial destination address, and perform inner tunnel encapsulation on the first packet based on the first source address and the first destination address, where the inner tunnel is an end-to-end tunnel between the first CPE and the second CPE;

the inner encapsulation module 221 is further configured to:

send, by the first overlay VRF, the first packet on which the inner tunnel encapsulation is performed to the second underlay VRF corresponding to the first source address; and send, by the second underlay VRF, the first packet on which the inner tunnel encapsulation is performed to the second overlay VRF that is in the first CPE and that is connected to the second underlay VRF;

the outer tunnel encapsulation module 222 is further configured to:

determine, by the second overlay VRF, the second source address and the second destination address of the outer tunnel corresponding to the first destination address, and perform, based on the second source address and the second destination address, outer tunnel encapsulation on the first packet on which the inner tunnel encapsulation is performed;

the outer encapsulation module 222 is further configured to:

send, by the second overlay VRF, the first packet on which the outer tunnel encapsulation is performed to the first underlay VRF corresponding to the second source address; and the forwarding module 223 is configured to:

forward, by the first underlay VRF, the first packet on which the outer tunnel encapsulation is performed.

In an implementation, the second underlay VRF is connected to the second overlay VRF by using an outer loop.

In an implementation, the second underlay VRF is connected to the second overlay VRF through a corresponding physical port.

In an implementation, the second underlay VRF is connected to the second overlay VRF by using an inner loop.

In an implementation, the second underlay VRF is connected to the second overlay VRF through a corresponding loopback port.

In an implementation, the receiving module 220 is further includes:

receiving a connection establishment message sent by the controller, where the connection establishment message carries an identifier of the second underlay VRF and an identifier of the second overlay VRF; and establishing a connection between a loopback port corresponding to the second underlay VRF and a loopback port corresponding to the second overlay VRF.

In an implementation, the receiving module 220 is further configured to:

receive an overlay VRF configuration message sent by a controller, and establish a first overlay VRF in the first CPE;

receive an underlay VRF configuration message sent by the controller, and establish a first underlay VRF in the first CPE; and receive a port association message sent by the controller, and associate the first underlay VRF with the port corresponding to the first source address and the second source address.

In an implementation, the inner tunnel encapsulation module 221 is configured to:

determine, by the first overlay VRF, the first source address and the first destination address of the inner tunnel corresponding to the initial destination address, and perform inner tunnel encapsulation on the first packet based on the first source address and the first destination address;

the inner tunnel encapsulation module 221 is further configured to:

send, by the first overlay VRF, the first packet on which the inner tunnel encapsulation is performed to the first underlay VRF corresponding to the first source address;

the outer tunnel encapsulation module 222 is configured to:

determine, by the first underlay VRF, the second source address and the second destination address of the outer tunnel corresponding to the first destination address, and perform, based on the second source address and the second destination address, outer tunnel encapsulation on the first packet on which the inner tunnel encapsulation is performed; and the forwarding module 223 is configured to:

forward, by the first underlay VRF, the first packet on which the outer tunnel encapsulation is performed.

In an implementation, the inner tunnel encapsulation module is configured to: determine an inner tunnel with highest tunnel quality of service in a plurality of inner tunnels corresponding to the initial destination address, and determine a first source address and a first destination address of the inner tunnel with the highest tunnel quality of service.

It should be noted that, when the packet forwarding apparatus provided in the foregoing embodiment forwards a packet, division of the foregoing functional modules is merely used as an example for description. In actual application, the foregoing functions may be allocated to and completed by different function modules as required. That is, an internal structure of the first CPE is divided into different functional modules to implement all or some of the functions described above. In addition, the packet forwarding apparatus provided in the foregoing embodiment belongs to a same concept as the embodiments of the packet forwarding method. For an implementation process of the packet forwarding apparatus, refer to the method embodiments. Details are not described herein again.

Figure 23:
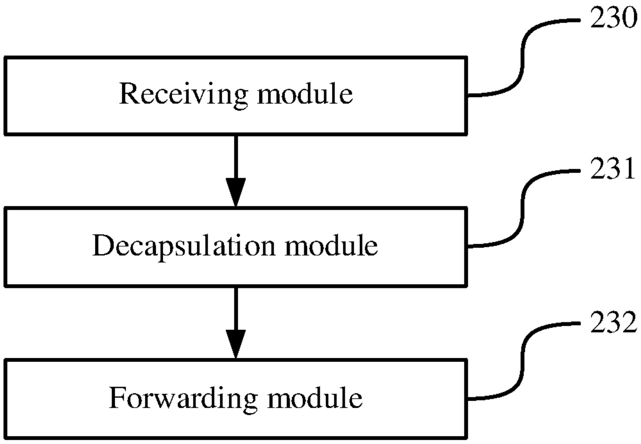
FIG. 23 is a diagram of a structure of a packet forwarding apparatus according to an embodiment of this application.

Based on a same technical concept, an embodiment of the present disclosure further provides a packet forwarding apparatus. The packet forwarding apparatus may be the GW in FIG. 9, FIG. 11, or FIG. 14. As shown in FIG. 23, the apparatus includes: a receiving module 230, a decapsulation module 231, and a forwarding module 232.

The receiving module 230 is configured to receive a first packet sent by first CPE. The first packet includes inner tunnel encapsulation and outer tunnel encapsulation, and the inner tunnel is an end-to-end tunnel between the first CPE and second CPE. For an implementation, refer to detailed descriptions of step S401 in the embodiment shown in FIG. 10, or detailed descriptions of step S501 in the embodiment shown in FIG. 12. Details are not described herein again.

The decapsulation module 231 is configured to remove the outer tunnel encapsulation of the first packet. For an implementation, refer to detailed descriptions of step S402 in the embodiment shown in FIG. 10, or detailed descriptions of step S502 in the embodiment shown in FIG. 12. Details are not described herein again.

The forwarding module 232 is configured to forward, based on a first destination address in the inner tunnel encapsulation of the first packet, the first packet from which the outer tunnel encapsulation is removed. The first destination address is associated with the second CPE. For an implementation, refer to detailed descriptions of step S403 in the embodiment shown in FIG. 10, or detailed descriptions of step S503 in the embodiment shown in FIG. 12. Details are not described herein again.

In an implementation, the forwarding module 232 is configured to:

determine a third source address and a third destination address of an outer tunnel corresponding to the first destination address in the inner tunnel encapsulation of the first packet, and perform, based on the third source address and the third destination address, further outer tunnel encapsulation on the first packet from which the outer tunnel encapsulation is removed; and forward the first packet on which the further outer tunnel encapsulation is performed.

In an implementation, the receiving module 240 is configured to:

receive a routing domain allocation message sent by a controller, and allocate a routing domain to a port corresponding to the third source address;

receive the third destination address sent by an RR, and establish the outer tunnel based on the third destination address and the third source address, where the routing domain of the port corresponding to the third source address is the same as a routing domain of a port corresponding to the third destination address; and establish a correspondence between the first destination address and the third source address and the third destination address of the outer tunnel.

It should be noted that, when the packet forwarding apparatus provided in the foregoing embodiment forwards a packet, division of the foregoing functional modules is merely used as an example for description. In actual application, the foregoing functions may be allocated to and completed by different function modules as required. That is, an internal structure of the GW is divided into different functional modules to implement all or some of the functions described above. In addition, the packet forwarding apparatus provided in the foregoing embodiment belongs to a same concept as the embodiments of the packet forwarding method. For an implementation process of the packet forwarding apparatus, refer to the method embodiments. Details are not described herein again.

Figure 24:
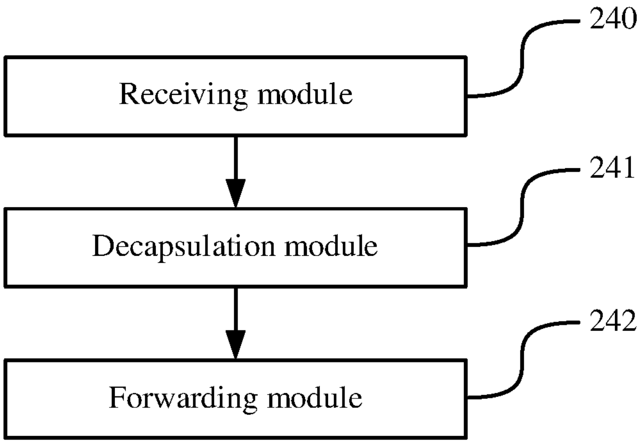
FIG. 24 is a diagram of a structure of a packet forwarding apparatus according to an embodiment of this application.

Based on a same technical concept, an embodiment of the present disclosure further provides a packet forwarding apparatus. The packet forwarding apparatus may be the CPE in FIG. 2, FIG. 3, FIG. 5, or FIG. 7. As shown in FIG. 24, the apparatus includes: a receiving module 240, a decapsulation module 241, and a forwarding module 242.

The receiving module 240 is configured to receive a first packet. The first packet is from first CPE, the first packet includes inner tunnel encapsulation and outer tunnel encapsulation, and the inner tunnel is an end-to-end tunnel between the first CPE and second CPE. For an implementation, refer to detailed descriptions of step S601 in the embodiment shown in FIG. 15, or detailed descriptions of step S701 in the embodiment shown in FIG. 17, or detailed descriptions of step S801 in the embodiment shown in FIG. 18, or detailed descriptions of step S901 in the embodiment shown in FIG. 19. Details are not described herein again.

The decapsulation module 241 is configured to remove the outer tunnel encapsulation of the first packet. For an implementation, refer to detailed descriptions of step S602 in the embodiment shown in FIG. 15, or step S801 in the embodiment shown in FIG. 18, or detailed descriptions of step S902 in the embodiment shown in FIG. 19. Details are not described herein again.

The decapsulation module 241 is configured to remove the inner tunnel encapsulation from the first packet from which the outer tunnel encapsulation is removed, and forward the first packet from which the inner tunnel encapsulation is removed. For an implementation, refer to detailed descriptions of step S603 in the embodiment shown in FIG. 15, or detailed descriptions of step S702 in the embodiment shown in FIG. 17, or detailed descriptions of step S802 in the embodiment shown in FIG. 18, or detailed descriptions of step S903 in the embodiment shown in FIG. 19. Details are not described herein again.

In an implementation, the receiving module 240 is configured to:

receive the first packet by using a first underlay VRF in the second CPE;

the decapsulation module 241 is configured to:

remove, by using the first overlay VRF, the inner tunnel encapsulation from the first packet from which the outer tunnel encapsulation is removed, and remove the outer tunnel encapsulation of the first packet by using the first underlay VRF; and send, to a first overlay VRF in the second CPE by using the first underlay VRF, the first packet from which the outer tunnel encapsulation is removed; and the forwarding module 242 is configured to:

forward the first packet from which the inner tunnel encapsulation is removed.

In an implementation, the receiving module 240 is configured to:

receive the first packet by using a first underlay VRF in the second CPE; and send the first packet to a second overlay VRF in the second CPE by using the first underlay VRF in the second CPE;

the decapsulation module 241 is configured to:

remove, by using the first overlay VRF, the inner tunnel encapsulation from the first packet from which the outer tunnel encapsulation is removed, and remove the outer tunnel encapsulation of the first packet by using the second overlay VRF; and send, to a first overlay VRF in the second CPE by using the second overlay VRF, the first packet from which the outer tunnel encapsulation is removed; and the forwarding module 242 is configured to:

forward the first packet from which the inner tunnel encapsulation is removed.

In an implementation, the decapsulation module 241 is configured to:

remove the outer tunnel encapsulation of the first packet by using the second overlay VRF, and send, to a second underlay VRF connected to the second overlay VRF, the first packet from which the outer tunnel encapsulation is removed; and send, to the first overlay VRF by using the second underlay VRF, the first packet from which the outer tunnel encapsulation is removed.

In an implementation, the second underlay VRF is connected to the second overlay VRF by using an outer loop.

In an implementation, the second underlay VRF is connected to the second overlay VRF through a corresponding physical port.

In an implementation, the second underlay VRF is connected to the second overlay VRF by using an inner loop.

In an implementation, the second underlay VRF is connected to the second overlay VRF through a corresponding loopback port.

It should be noted that, when the packet forwarding apparatus provided in the foregoing embodiment forwards a packet, division of the foregoing functional modules is merely used as an example for description. In actual application, the foregoing functions may be allocated to and completed by different function modules as required. That is, an internal structure of the second CPE is divided into different functional modules to implement all or some of the functions described above. In addition, the packet forwarding apparatus provided in the foregoing embodiment belongs to a same concept as the embodiments of the packet forwarding method. For an implementation process of the packet forwarding apparatus, refer to the method embodiments. Details are not described herein again.

Figure 25:
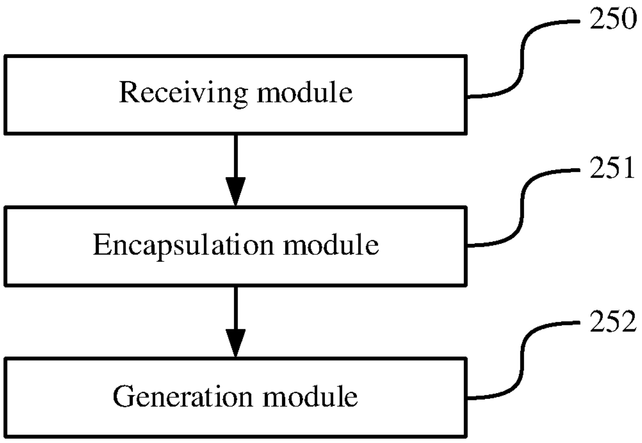
FIG. 25 is a diagram of a structure of a CPE configuration apparatus according to an embodiment of this application.

Based on a same technical concept, an embodiment of this application further provides a CPE configuration apparatus configuration method. The packet forwarding apparatus may be the CPE in FIG. 2, FIG. 3, FIG. 5, or FIG. 7. As shown in FIG. 25, the apparatus includes: a receiving module 250, an encapsulation module 251, and a generation module 252.

The receiving module 250 is configured to receive a second destination address associated with a GW and sent by an RR, and establish an outer tunnel based on a second source address and the second destination address. For an implementation, refer to detailed descriptions of step S1112 in the embodiment shown in FIG. 21. Details are not described herein again.

The encapsulation module 251 is configured to receive a first destination address associated with second CPE and sent by the RR, and establish an inner tunnel based on a first source address and the first destination address. The inner tunnel is an end-to-end tunnel between first CPE and the second CPE. For an implementation, refer to detailed descriptions of step S1114 in the embodiment shown in FIG. 21. Details are not described herein again.

The generation module 252 is configured to generate routing information of the inner tunnel in the first CPE. The routing information includes a correspondence between the first destination address and the second source address and second destination address. For an implementation, refer to detailed descriptions of step S1114 in the embodiment shown in FIG. 21. Details are not described herein again.

In an implementation, the receiving module 250 is further configured to:

receive a first packet, and obtain an initial destination address of the first packet;

determine the first source address and the first destination address of the inner tunnel corresponding to the initial destination address, and perform inner tunnel encapsulation on the first packet based on the first source address and the first destination address, where the inner tunnel is an end-to-end tunnel between the first CPE and the second CPE;

determine the second source address and the second destination address of the outer tunnel corresponding to the first destination address, and perform, based on the second source address and the second destination address, outer tunnel encapsulation on the first packet on which the inner tunnel encapsulation is performed; and forward the first packet on which the outer tunnel encapsulation is performed.

In an implementation, the receiving module 250 is further configured to:

receive an overlay VRF configuration message sent by a controller, and establish a first overlay VRF and a second overlay VRF in the first CPE;

receive an underlay VRF configuration message sent by the controller, and establish a first underlay VRF in the first CPE; and receive a port association message sent by the controller, associate the second overlay VRF with the port corresponding to the first source address, and associate the first underlay VRF with the port corresponding to second source address.

In an implementation, the receiving module 250 is further configured to:

receive a first packet, and obtain an initial destination address of the first packet;

determine, by the first overlay VRF, the first source address and the first destination address of the inner tunnel corresponding to the initial destination address, perform inner tunnel encapsulation on the first packet based on the first source address and the first destination address, where the inner tunnel is an end-to-end tunnel between the first CPE and the second CPE; and send the first packet on which the inner tunnel encapsulation is performed to the second overlay VRF corresponding to the first source address;

determine, by the second overlay VRF, the second source address and the second destination address of the outer tunnel corresponding to the first destination address, perform, based on the second source address and the second destination address, outer tunnel encapsulation on the first packet on which the inner tunnel encapsulation is performed, and send the first packet on which the outer tunnel encapsulation is performed to the first underlay VRF corresponding to the second source address; and forward, by the first underlay VRF, the first packet on which the outer tunnel encapsulation is performed.

In an implementation, the receiving module 250 is further configured to:

receive an overlay VRF configuration message sent by a controller, and establish a first overlay VRF and a second overlay VRF in the first CPE;

receive an underlay VRF configuration message sent by the controller, and establish a first underlay VRF and a second underlay VRF in the first CPE; and receive a port association message sent by the controller, associate the second underlay VRF with the port corresponding to the first source address, and associate the first underlay VRF with the port corresponding to second source address.

In an implementation, the receiving module 250 is further configured to:

receive a first packet, and obtain an initial destination address of the first packet;

determine, by the first overlay VRF, the first source address and the first destination address of the inner tunnel corresponding to the initial destination address, perform inner tunnel encapsulation on the first packet based on the first source address and the first destination address, where the inner tunnel is an end-to-end tunnel between the first CPE and the second CPE, and send the first packet on which the inner tunnel encapsulation is performed to the second underlay VRF corresponding to the first source address;

send, by the second underlay VRF, the first packet on which the inner tunnel encapsulation is performed to the second overlay VRF that is in the first CPE and that is connected to the second underlay VRF;

determine, by the second overlay VRF, the second source address and the second destination address of the outer tunnel corresponding to the first destination address, perform, based on the second source address and the second destination address, outer tunnel encapsulation on the first packet on which the inner tunnel encapsulation is performed, and send the first packet on which the outer tunnel encapsulation is performed to the first underlay VRF corresponding to the second source address; and forward, by the first underlay VRF, the first packet on which the outer tunnel encapsulation is performed.

In an implementation, the receiving module 250 is further configured to:

receive an overlay VRF configuration message sent by a controller, and establish a first overlay VRF in the first CPE;

receive an underlay VRF configuration message sent by the controller, and establish a first underlay VRF in the first CPE; and receive a port association message sent by the controller, and associate the first overlay VRF with the port corresponding to the first source address and the second source address.

In an implementation, the receiving module 250 is further configured to:

receive a first packet, and obtain an initial destination address of the first packet;

determine, by the first overlay VRF, the first source address and the first destination address of the inner tunnel corresponding to the initial destination address, perform inner tunnel encapsulation on the first packet based on the first source address and the first destination address, and send the first packet on which the inner tunnel encapsulation is performed to the first underlay VRF corresponding to the first source address; and determine, by the first underlay VRF, the second source address and the second destination address of the outer tunnel corresponding to the first destination address, perform, based on the second source address and the second destination address, outer tunnel encapsulation on the first packet on which the inner tunnel encapsulation is performed, and forward the first packet on which the outer tunnel encapsulation is performed.

It should be noted that, when the CPE configuration apparatus provided in the foregoing embodiment forwards a packet, division of the foregoing functional modules is merely used as an example for description. In actual application, the foregoing functions may be allocated to and completed by different function modules as required. That is, an internal structure of the first CPE is divided into different functional modules to implement all or some of the functions described above. In addition, the CPE configuration apparatus provided in the foregoing embodiment belongs to a same concept as the embodiments of the packet forwarding method. For an implementation process of the packet forwarding apparatus, refer to the method embodiments. Details are not described herein again.

Figure 26:
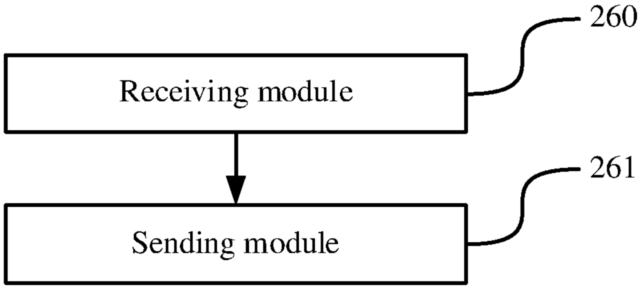
FIG. 26 is a diagram of a structure of a CPE configuration apparatus according to an embodiment of this application.

An embodiment of this application further provides a CPE configuration apparatus. The apparatus may be an RR. As shown in FIG. 26, the apparatus includes a receiving module 260 and a sending module 261.

The receiving module 260 is configured to receive a second destination address associated with a GW and sent by the GW. For an implementation, refer to detailed descriptions of step S1111 in the embodiment shown in FIG. 21. Details are not described herein again.

The sending module 261 is configured to send the second destination address to first CPE. For an implementation, refer to detailed descriptions of step S1111 in the embodiment shown in FIG. 21. Details are not described herein again.

The receiving module 260 is configured to receive a first destination address associated with second CPE and sent by the second CPE. For an implementation, refer to detailed descriptions of step S1113 in the embodiment shown in FIG. 21. Details are not described herein again.

The sending module 261 is configured to send the first destination address to the first CPE. For an implementation, refer to detailed descriptions of step S1113 in the embodiment shown in FIG. 21. Details are not described herein again.

It should be noted that, when the CPE configuration apparatus provided in the foregoing embodiment configures CPE, division of the foregoing functional modules is merely used as an example for description. In actual application, the foregoing functions may be allocated to and completed by different function modules as required. That is, an internal structure of the RR is divided into different functional modules to implement all or some of the functions described above. In addition, the CPE configuration apparatus provided in the foregoing embodiment belongs to a same concept as the embodiments of the CPE configuration method. For an implementation process of the CPE configuration apparatus, refer to the method embodiments. Details are not described herein again.

Figure 27:
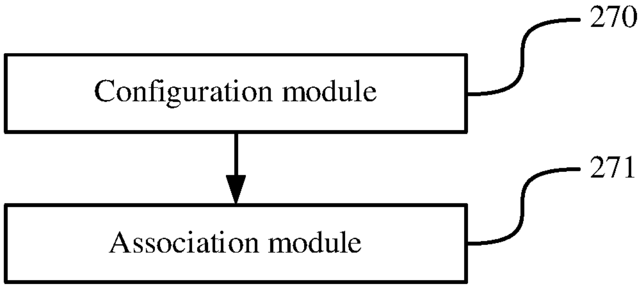
FIG. 27 is a diagram of a structure of a CPE configuration apparatus according to an embodiment of this application.

An embodiment of this application further provides a CPE configuration apparatus. The apparatus is applied to a controller. As shown in FIG. 27, the apparatus includes a configuration module 270 and an association module 271.

The configuration module 270 is configured to send an overlay VRF configuration message to first CPE, and send an underlay VRF configuration message to the first CPE. For an implementation, refer to detailed descriptions of step S113 in the embodiment shown in FIG. 21. Details are not described herein again.

The association module 271 is configured to send a port association message to the first CPE. For an implementation, refer to detailed descriptions of step S115 in the embodiment shown in FIG. 21. Details are not described herein again.

In an implementation, the overlay VRF configuration message carries a VRF identifier of a first overlay VRF and a VRF identifier of a second overlay VRF;

- the underlay VRF configuration message carries a VRF identifier of a first underlay VRF; and
- the port association message carries a correspondence between the VRF identifier of the second overlay VRF and a first source address, and a correspondence between the VRF identifier of the first underlay VRF and a second source address.

In an implementation, the overlay VRF configuration message carries a VRF identifier of a first overlay VRF and a VRF identifier of a second overlay VRF;

- the underlay VRF configuration message carries a VRF identifier of a first underlay VRF and a VRF identifier of a second underlay VRF; and
- the port association message carries a correspondence between the VRF identifier of the second underlay VRF and a first source address, and a correspondence between the VRF identifier of the first underlay VRF and a second source address.

In an implementation, the overlay VRF configuration message carries a VRF identifier of a first overlay VRF;

- the underlay VRF configuration message carries a VRF identifier of a first underlay VRF; and
- the port association message carries a correspondence between the VRF identifier of the first overlay VRF and a first source address and second source address.

It should be noted that, when the CPE configuration apparatus provided in the foregoing embodiment configures CPE, division of the foregoing functional modules is merely used as an example for description. In actual application, the foregoing functions may be allocated to and completed by different function modules as required. That is, an internal structure of the controller is divided into different functional modules to implement all or some of the functions described above. In addition, the CPE configuration apparatus provided in the foregoing embodiment belongs to a same concept as the embodiments of the CPE configuration method. For an implementation process of the CPE configuration apparatus, refer to the method embodiments. Details are not described herein again.

Figure 28:
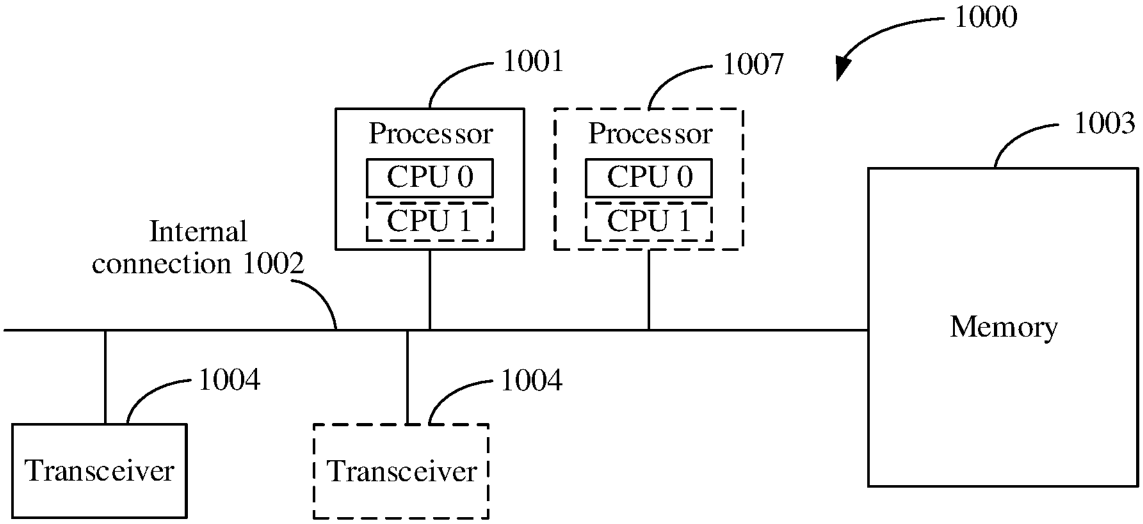
FIG. 28 is a diagram of a structure of a communication device according to an embodiment of this application.

FIG. 28 is a diagram of a communication device 1000 according to an embodiment of this application. The communication device 1000 may be first CPE that performs any one of the methods in FIG. 4, FIG. 6, and FIG. 8. The communication device 1000 includes at least one processor 1001, an internal connection 1002, a memory 1003, and at least one transceiver 1004.

Optionally, the processor 1001 may be a general-purpose central processing unit (CPU), a network processor (NP), a microprocessor, an application-specific integrated circuit (ASIC), or one or more integrated circuits configured to control program execution of the solutions in this application.

The internal connection 1002 may include a path for transmitting information between the foregoing components. Optionally, the internal connection 1002 is a board, a bus, or the like.

The transceiver 1004 is configured to communicate with another device or a communication network.

The memory 1003 may be, but is not limited to, a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, and a blue-ray disc, or the like), a magnetic disk storage medium or another magnetic storage device, or any other medium that can be used to carry or store expected program code in an instruction or data structure form and can be accessed by a computer. The memory may exist independently, and is connected to the processor by using the bus. Alternatively, the memory may be integrated with the processor.

The memory 1003 is configured to store application program code for executing the solutions of this application, and the processor 1001 controls execution. The processor 1001 is configured to execute the application program code stored in the memory 1003, and cooperate with the at least one transceiver 1004, so that the communication device 1000 implements a function in this application.

During implementation, in an embodiment, the processor 1001 may include one or more CPUs, for example, a CPU 0 and a CPU 1 shown in FIG. 27.

During implementation, in an embodiment, the communication device 1000 may include a plurality of processors, for example, the processor 1001 and a processor 1007 shown in FIG. 27. Each of the processors may be a single-core (single-CPU) processor, or may be a multi-core (multi-CPU) processor. The processor herein may be one or more devices, circuits, and/or processing cores configured to process data (for example, computer program instructions).

The communication device 1000 may be first CPE, second CPE, a GW, or the like.

When the communication device 1000 is first CPE, the processor 1001 executes the application program code stored in the memory 1003, so that the communication device 1000 performs the following processing:

receiving a first packet, and obtaining an initial destination address of the first packet; determining a first source address and a first destination address of an inner tunnel corresponding to the initial destination address, and performing inner tunnel encapsulation on the first packet based on the first source address and the first destination address, where the inner tunnel is an end-to-end tunnel between the first CPE and second CPE; determining a second source address and a second destination address of an outer tunnel corresponding to the first destination address, and performing, based on the second source address and the second destination address, outer tunnel encapsulation on the first packet on which the inner tunnel encapsulation is performed; and forwarding the first packet on which the outer tunnel encapsulation is performed.

For an implementation of processing performed by the communication device 1000, refer to the processing processes of the first CPE in the embodiments shown in FIG. 4, FIG. 6, and FIG. 8.

When the communication device 1000 is second CPE, the processor 1001 executes the application program code stored in the processor 1003, so that the communication device 1000 performs the following processing:

receiving a first packet, where the first packet includes inner tunnel encapsulation and outer tunnel encapsulation; removing the outer tunnel encapsulation of the first packet; and removing the inner tunnel encapsulation from the first packet from which the outer tunnel encapsulation is removed, and forwarding the first packet from which the inner tunnel encapsulation is removed.

For an implementation of processing performed by the communication device 1000, refer to the processing processes of the second CPE in the embodiments shown in FIG. 15, FIG. 17, FIG. 18, and FIG. 19.

When the communication device 1000 is a GW, the processor 1001 executes the application program code stored in the processor 1003, so that the communication device 1000 performs the following processing:

receiving a first packet sent by first CPE, where the first packet includes inner tunnel encapsulation and outer tunnel encapsulation; removing the outer tunnel encapsulation of the first packet; and forwarding, based on a first destination address in the inner tunnel encapsulation of the first packet, the first packet from which the outer tunnel encapsulation is removed.

For an implementation of processing performed by the communication device 1000, refer to the processing processes of the GW in the embodiments shown in FIG. 10, FIG. 12, and FIG. 13.

When the communication device 1000 is an RR, the processor 1001 executes the application program code stored in the processor 1003, so that the communication device 1000 performs the following processing:

receiving a second destination address associated with a GW and sent by the GW, sending the second destination address to first CPE, receiving a first destination address associated with second CPE and sent by the second CPE, and sending the first destination address to the first CPE.

For an implementation of processing performed by the communication device 1000, refer to the processing process of the RR in the embodiment shown in FIG. 21.

When the communication device 1000 is a controller, the processor 1001 executes the application program code stored in the processor 1003, so that the communication device 1000 performs the following processing:

sending an overlay VRF configuration message to first CPE, sending an underlay VRF configuration message to the first CPE, and sending a port association message to the first CPE.

For an implementation of processing performed by the communication device 1000, refer to the processing process of the controller in the embodiment shown in FIG. 21.

All or some of the foregoing embodiments may be implemented by using software, hardware, firmware, or any combination thereof. When software is used for implementation, all or some of the embodiments may be implemented in a form of a computer program product. The computer program product includes one or more computer instructions, and when the computer program instructions are loaded and executed on a device, all or some of the processes or functions described in embodiments of this application are generated. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a device, or a data storage device, such as a server or a data center, integrating one or more usable media. The usable medium may be a magnetic medium (such as a floppy disk, a hard disk, or a magnetic tape) or an optical medium (such as a digital video disk (DVD)) or a semiconductor medium (such as a solid state disk).

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made without departing from the principle of this application should fall within the protection scope of this application.

What is claimed is:

1. A packet forwarding method applied to a network system including a first customer premises equipment (CPE) and a second customer premises equipment (CPE), the method is executed by the first CPE, the method comprising:

receiving, by the first CPE, a first packet, and obtaining an initial destination address of the first packet;

determining, by the first CPE, a first source address and a first destination address of an inner tunnel corresponding to the initial destination address, the determining including receiving the first destination address sent by a route reflector (RR) and establishing the inner tunnel based on the first source address and the first destination address, wherein a routing domain of a port corresponding to the first destination address is the same as a routing domain of a port corresponding to the first source address, and performing an inner tunnel encapsulation on the first packet based on the first source address and the first destination address, the inner tunnel being an end-to-end tunnel between the first CPE and the second CPE;

determining, by the first CPE, a second source address and a second destination address of an outer tunnel corresponding to the first destination address, the determining including receiving the second destination address sent by the RR and establishing the outer tunnel based on the second source address and the second destination address, wherein a routing domain of a port corresponding to the second destination address is the same as a routing domain of a port corresponding to the second source address, and performing, based on the second source address and the second destination address, an outer tunnel encapsulation on the first packet on which the inner tunnel encapsulation is performed; and forwarding, by the first CPE, the first packet.

2. The method according to claim 1, wherein the method further comprises:

generating routing information of the inner tunnel in the first CPE, wherein the routing information comprises a correspondence between the first destination address, the second source address, and the second destination address.

3. The method according to claim 2, wherein the method further comprises:

receiving an overlay virtual routing and forwarding (VRF) configuration message sent by a controller, and establishing a first overlay VRF and a second overlay VRF in the first CPE;

receiving an underlay VRF configuration message sent by the controller, and establishing a first underlay VRF and a second underlay VRF in the first CPE; and receiving a port association message sent by the controller, associating the second underlay VRF with the port corresponding to the first source address, and associating the first underlay VRF with the port corresponding to the second source address.

4. The method according to claim 3, wherein the determining the first source address and the first destination address of an inner tunnel corresponding to the initial destination address, and performing the inner tunnel encapsulation on the first packet based on the first source address and the first destination address comprises:

determining, using the first overlay VRF, the first source address and the first destination address of the inner tunnel corresponding to the initial destination address, and performing the inner tunnel encapsulation on the first packet based on the first source address and the first destination address, wherein the inner tunnel is an end-to-end tunnel between the first CPE and the second CPE;

the method further comprises:

sending, using the first overlay VRF, the first packet on which the inner tunnel encapsulation is performed to the second underlay VRF corresponding to the first source address;

sending, using the second underlay VRF, the first packet on which the inner tunnel encapsulation is performed to the second overlay VRF in the first CPE and that is connected to the second underlay VRF;

the determining the second source address and the second destination address of the outer tunnel corresponding to the first destination address, and performing, based on the second source address and the second destination address, the outer tunnel encapsulation on the first packet on which the inner tunnel encapsulation is performed comprises:

determining, using the second overlay VRF, the second source address and the second destination address of the outer tunnel corresponding to the first destination address, and performing, based on the second source address and the second destination address, the outer tunnel encapsulation on the first packet on which the inner tunnel encapsulation is performed;

the method further comprises:

sending, using the second overlay VRF, the first packet on which the outer tunnel encapsulation is performed to the first underlay VRF corresponding to the second source address; and the forwarding the first packet on which the outer tunnel encapsulation is performed comprises:

forwarding, using the first underlay VRF, the first packet on which the outer tunnel encapsulation is performed.

5. The method according to claim 3, wherein the second underlay VRF is connected to the second overlay VRF using an outer loop.

6. The method according to claim 5, wherein the second underlay VRF is connected to the second overlay VRF through a corresponding physical port.

7. The method according to claim 3, wherein the second underlay VRF is connected to the second overlay VRF using an inner loop.

8. The method according to claim 7, wherein the second underlay VRF is connected to the second overlay VRF through a corresponding loopback port.

9. The method according to claim 8, wherein the method further comprises:

receiving a connection establishment message sent by the controller, wherein the connection establishment message carries an identifier of the second underlay VRF and an identifier of the second overlay VRF; and establishing a connection between a loopback port corresponding to the second underlay VRF and a loopback port corresponding to the second overlay VRF.

10. The method according to claim 2, wherein the method further comprises:

receiving an overlay virtual routing and forwarding (VRF) configuration message sent by a controller, and establishing a first overlay VRF in the first CPE;

receiving an underlay VRF configuration message sent by the controller, and establishing a first underlay VRF in the first CPE; and receiving a port association message sent by the controller, and associating the first underlay VRF with the port corresponding to the first source address and the second source address.

11. The method according to claim 10, wherein the determining the first source address and the first destination address of the inner tunnel corresponding to the initial destination address, and performing the inner tunnel encapsulation on the first packet based on the first source address and the first destination address comprises:

determining, by the first overlay VRF, the first source address and the first destination address of the inner tunnel corresponding to the initial destination address, and performing the inner tunnel encapsulation on the first packet based on the first source address and the first destination address;

the method further comprises:

sending, by the first overlay VRF, the first packet on which the inner tunnel encapsulation is performed to the first underlay VRF corresponding to the first source address;

the determining the second source address and the second destination address of the outer tunnel corresponding to the first destination address, and performing, based on the second source address and the second destination address, the outer tunnel encapsulation on the first packet on which the inner tunnel encapsulation is performed comprises:

determining, by the first underlay VRF, the second source address and the second destination address of the outer tunnel corresponding to the first destination address, and performing, based on the second source address and the second destination address, the outer tunnel encapsulation on the first packet on which the inner tunnel encapsulation is performed; and the forwarding the first packet on which the outer tunnel encapsulation is performed comprises:

forwarding, by the first underlay VRF, the first packet on which the outer tunnel encapsulation is performed.

12. The method according to claim 1, wherein the method further comprises:

receiving an overlay virtual routing and forwarding (VRF) configuration message sent by a controller, and establishing a first overlay VRF and a second overlay VRF in the first CPE;

receiving an underlay VRF configuration message sent by the controller, and establishing a first underlay VRF in the first CPE; and receiving a port association message sent by the controller, associating the second overlay VRF with the port corresponding to the first source address, and associating the first underlay VRF with the port corresponding to second source address.

13. The method according to claim 1, wherein the determining the first source address and the first destination address of an inner tunnel corresponding to the initial destination address, and performing the inner tunnel encapsulation on the first packet based on the first source address and the first destination address comprises:

determining, using the first overlay virtual routing and forwarding (VRF), the first source address and the first destination address of the inner tunnel corresponding to the initial destination address, and performing the inner tunnel encapsulation on the first packet based on the first source address and the first destination address, wherein the inner tunnel is an end-to-end tunnel between the first CPE and the second CPE;

the method further comprises:

sending, using the first overlay VRF, the first packet on which the inner tunnel encapsulation is performed to the second overlay VRF corresponding to the first source address;

the determining the second source address and the second destination address of the outer tunnel corresponding to the first destination address, and performing, based on the second source address and the second destination address, the outer tunnel encapsulation on the first packet on which the inner tunnel encapsulation is performed comprises:

determining, using the second overlay VRF, the second source address and the second destination address of the outer tunnel corresponding to the first destination address, and performing, based on the second source address and the second destination address, the outer tunnel encapsulation on the first packet on which the inner tunnel encapsulation is performed;

the method further comprises:

sending, using the second overlay VRF, the first packet on which the outer tunnel encapsulation is performed to a first underlay VRF corresponding to the second source address; and the forwarding the first packet on which the outer tunnel encapsulation is performed comprises:

forwarding, using the first underlay VRF, the first packet on which the outer tunnel encapsulation is performed.

14. A network device, comprising:

a memory storing instructions; and at least one processor in communication with the memory, the at least one processor configured, upon execution of the instructions, to perform the following steps:

receive a first packet and obtain an initial destination address of the first packet;

determine a first source address and a first destination address of an inner tunnel corresponding to the initial destination address, the determining including receiving the first destination address sent by a route reflector (RR) and establishing the inner tunnel based on the first source address and the first destination address, wherein a routing domain of a port corresponding to the first destination address is the same as a routing domain of a port corresponding to the first source address, and perform an inner tunnel encapsulation on the first packet based on the first source address and the first destination address, the inner tunnel being an end-to-end tunnel between the first CPE and the second CPE;

determine a second source address and a second destination address of an outer tunnel corresponding to the first destination address, the determining including receiving the second destination address sent by the RR and establishing the outer tunnel based on the second source address and the second destination address, wherein a routing domain of a port corresponding to the second destination address is the same as a routing domain of a port corresponding to the second source address, and perform, based on the second source address and the second destination address, an outer tunnel encapsulation on the first packet on which the inner tunnel encapsulation is performed; and forward the first packet.

15. The network device according to claim 14, wherein the at least one processor further executes the instructions to perform the steps of:

generate routing information of the inner tunnel in the first CPE, wherein the routing information comprises a correspondence between the first destination address, the second source address, and the second destination address.

16. The network device according to claim 15, wherein the at least one processor further executes the instructions to perform the steps of:

receive an overlay virtual routing and forwarding (VRF) configuration message sent by a controller and establish a first overlay VRF and a second overlay VRF in the first CPE;

receive an underlay VRF configuration message sent by the controller and establish a first underlay VRF and a second underlay VRF in the first CPE; and receive a port association message sent by the controller, associating the second underlay VRF with the port corresponding to the first source address, and associate the first underlay VRF with the port corresponding to the second source address.

17. The network device according to claim 14, wherein the at least one processor further executes the instructions to perform the steps of:

receive an overlay virtual routing and forwarding (VRF) configuration message sent by a controller and establish a first overlay VRF and a second overlay VRF in the first CPE;

receive an underlay VRF configuration message sent by the controller and establish a first underlay VRF in the first CPE; and receive a port association message sent by the controller, associating the second overlay VRF with the port corresponding to the first source address, and associate the first underlay VRF with the port corresponding to second source address.

18. The network device according to claim 17, wherein the second underlay VRF is connected to the second overlay VRF using an outer loop.

19. The network device according to claim 17, wherein the second underlay VRF is connected to the second overlay VRF through a corresponding loopback port.

20. The network device according to claim 14, wherein the at least one processor further executes the instructions to perform the steps of:

determine, using the first overlay virtual routing and forwarding (VRF), the first source address and the first destination address of the inner tunnel corresponding to the initial destination address, and perform the inner tunnel encapsulation on the first packet based on the first source address and the first destination address, wherein the inner tunnel is an end-to-end tunnel between the first CPE and the second CPE;

send, using the first overlay VRF, the first packet on which the inner tunnel encapsulation is performed to the second underlay VRF corresponding to the first source address;

send, using the second underlay VRF, the first packet on which the inner tunnel encapsulation is performed to the second overlay VRF in the first CPE and that is connected to the second underlay VRF;

determine, using the second overlay VRF, the second source address and the second destination address of the outer tunnel corresponding to the first destination address, and perform, based on the second source address and the second destination address, the outer tunnel encapsulation on the first packet on which the inner tunnel encapsulation is performed;

send, using the second overlay VRF, the first packet on which the outer tunnel encapsulation is performed to the first underlay VRF corresponding to the second source address; and forward, using the first underlay VRF, the first packet on which the outer tunnel encapsulation is performed.

* * * * *